US011796798B2

(12) United States Patent
Gopinath et al.

(10) Patent No.: US 11,796,798 B2
(45) Date of Patent: Oct. 24, 2023

(54) METHODS AND SYSTEMS FOR IMAGING WITH ABERRATION CORRECTION

(71) Applicant: The Regents of the University of Colorado, Denver, CO (US)

(72) Inventors: Juliet Gopinath, Boulder, CO (US); Mo Zohrabi, Boulder, CO (US); Victor M. Bright, Boulder, CO (US); Omkar Supekar, Boulder, CO (US); Robert H. Cormack, Erie, CO (US); Emily Gibson, Boulder, CO (US); Connor McCullough, Denver, CO (US)

(73) Assignee: The Regents of the University of Colorado, Denver, CO (US)

( * ) Notice: Subject to any disclaimer, the term of this patent is extended or adjusted under 35 U.S.C. 154(b) by 250 days.

(21) Appl. No.: 16/753,615

(22) PCT Filed: Oct. 3, 2018

(86) PCT No.: PCT/US2018/054224
§ 371 (c)(1),
(2) Date: Apr. 3, 2020

(87) PCT Pub. No.: WO2019/070892
PCT Pub. Date: Apr. 11, 2019

(65) Prior Publication Data
US 2020/0292810 A1      Sep. 17, 2020

Related U.S. Application Data

(60) Provisional application No. 62/567,636, filed on Oct. 3, 2017.

(51) Int. Cl.
*G02B 27/00* (2006.01)
*G02B 21/06* (2006.01)

(52) U.S. Cl.
CPC ......... *G02B 27/0068* (2013.01); *G02B 21/06* (2013.01)

(58) Field of Classification Search
USPC ....................................................... 359/637
See application file for complete search history.

(56) References Cited

U.S. PATENT DOCUMENTS 7,764,433 B2    7/2010   Kam et al.
8,107,705 B2    1/2012   Dowski, Jr. et al.
(Continued)

OTHER PUBLICATIONS

PCT International Search Report and Written Opinion, PCT Application No. PCT/US2018/054224, dated Mar. 11, 2019, 15 pages.
(Continued)

*Primary Examiner* — Collin X Beatty
*Assistant Examiner* — Grant A Gagnon
(74) *Attorney, Agent, or Firm* — McDonnell Boehnen Hulbert & Berghoff LLP

(57) ABSTRACT

The present disclosure relates generally to methods and systems useful in imaging applications, especially biological imaging applications, and applications in the metrology, atmospheric, scientific and medical fields. In one aspect, the disclosure provides a method of imaging an object, including illuminating the object with incident radiation through one or more adaptive optical elements; receiving transmitted radiation from the object at a photodetector to provide a base image; and performing the following steps one or more times: adjusting the one or more adaptive optical elements, the adjustment including modifying an optical transfer function of the one or more adaptive optical elements, and receiving transmitted radiation from the object at the photodetector to provide an adjusted image; wherein the adjustment and receiving steps are performed until the adjusted image has substantially reduced aberrations compared to the base image.

20 Claims, 13 Drawing Sheets

(56) References Cited

U.S. PATENT DOCUMENTS

| | | |
|---|---|---|
| 9,423,600 B2 | 8/2016 | Matsumoto |
| 2004/0057089 A1 | 3/2004 | Voelkl |
| 2006/0092814 A1 | 5/2006 | Jeong et al. |
| 2010/0123007 A1* | 5/2010 | Wittenberg .......... G02B 26/005 235/454 |

OTHER PUBLICATIONS

H. Hofer, "Impovement in retinal image quality with dynamic correction of the eye's abberrations," Optics Express, 8 (11), 631-43 (2001).

* cited by examiner

Clean glass tube

Parylene HT & Teflon dip coat 3D printed shadow mask

Glass tube bonded to optical window with ground electrode

Electrode deposition

Bonding printed circuit board

METHODS AND SYSTEMS FOR IMAGING WITH ABERRATION CORRECTION

CROSS-REFERENCE TO RELATED APPLICATIONS

This application is a U.S. National Stage application under 35 U.S.C. 371 of International Patent Application no. PCT/US2018/054224, filed Oct. 3, 2018, which claims the benefit of priority of U.S. Provisional Patent Application No. 62/567,636, filed Oct. 3, 2017, which is hereby incorporated herein by reference in its entirety.

STATEMENT OF GOVERNMENT SUPPORT

This invention was made with government support under grant numbers DB11353757 and CBET1631704 awarded by the National Science Foundation, grant number N00014-15-1-2739 awarded by the Office of Naval Research, and grant number OD023852 awarded by the National Institutes of Health. The government has certain rights in the invention.

BACKGROUND OF THE DISCLOSURE

1. Field of the Disclosure

The present disclosure relates generally to methods any systems useful in imaging applications, especially biological imaging applications, and applications in the metrology, atmospheric, scientific and medical fields. More particularly, in certain aspects the present disclosure relates to aberration correction in imaging applications.

2. Technical Background

Wavefront aberration is one of the major challenges for many optical systems. Aberrations can be caused by optical elements in the system, as well as by an object to be imaged or the atmosphere between optical elements in the system and between the optical system and the sample to be imaged. The presence of aberrations reduces resolution and contrast, and correction can be essential to achieve diffraction-limited performance. In multiphoton microscopy, used for three-dimensional imaging of biological specimens, the emitted signal has a power law dependence on excitation intensity and aberrations greatly affect the imaging depth. For instance, a specimen under investigation for in vivo two-photon imaging can cause wavefront distortion, leading to poor imaging contrast. Aberrations degrade the point-spread function (PSF) and can produce a weak fluorescence signal that will constrain the maximum achievable imaging depth. Other areas that stand to benefit from aberration correction include laser ablation of tissue for laser surgery and atmospheric science, where atmospheric turbulence can be problematic.

While there have been proposed a number of adaptive imaging techniques to correct aberrations in optical systems, they can suffer from one or more of complexity, high cost, and insufficient aberration correction. Thus, there remains a need for optical imaging technologies that overcome one or more of these shortcomings in the art.

SUMMARY OF THE DISCLOSURE

In one aspect, the present disclosure provides a method of imaging an object, the method comprising:
providing an optical imaging system comprising
a source of incident radiation,
an optical assembly comprising one or more adaptive optical elements, the optical assembly being disposed in a beam path between the source of radiation and the object, and
a photodetector disposed so as to detect transmitted radiation resulting from the interaction of the incident radiation with the object;
illuminating the object with incident radiation from the source of radiation through the one or more adaptive optical elements;
receiving transmitted radiation from the object at the photodetector to provide a base image; and
performing the following steps one or more times:
adjusting the one or more adaptive optical elements, the adjustment including modifying an optical transfer function of the one or more adaptive optical elements, and
receiving transmitted radiation from the object at the photodetector to provide an adjusted image;
wherein the adjustment and receiving steps are performed until the adjusted image has substantially reduced aberrations compared to the base image.

In another aspect, the present disclosure provides a method of imaging an object, the method comprising:
providing an optical imaging system comprising
an optical assembly comprising one or more adaptive optical elements; and
a photodetector disposed so as to detect transmitted radiation from the object, the optical assembly being disposed in a beam path between the photodetector and the object, and
receiving transmitted radiation from the object at the photodetector to provide a base image; and
performing the following steps one or more times:
adjusting the one or more adaptive optical elements, the adjustment including modifying an optical transfer function of the one or more adaptive optical elements, and
receiving transmitted radiation from the object at the photodetector to provide an adjusted image;
wherein the adjustment and receiving steps are performed until the adjusted image has substantially reduced aberrations compared to the base image.

In another aspect, the present disclosure provides an optical imaging system for use with an object to be imaged, the optical imaging system comprising:
a source of incident radiation,
an optical assembly comprising a first adaptive optical element and a second adaptive optical element, the optical assembly being disposed in a beam path between the source of radiation and the object, and
a photodetector disposed so as to detect transmitted radiation resulting from the interaction of the incident radiation with the object.

In another aspect, the present disclosure provides an optical imaging system for use with an object to be imaged, the optical imaging system comprising:
an optical assembly comprising a first adaptive optical element and a second adaptive optical element, the first adaptive optical element having opposite overall focusing properties as compared to the second optical element; and
a photodetector disposed so as to detect transmitted radiation from the object, the optical assembly being disposed in a beam path between the photodetector and the object.

In certain embodiments of the various aspects described herein, each of the adaptive optical elements is a multielectrode electrowetting optical element, for example, having at least three or even at least six independently-addressable electrodes.

BRIEF DESCRIPTION OF THE DRAWINGS

The patent or application file contains at least one drawing executed in color. Copies of this patent or patent application publication with color drawings will be provided by the Office upon request and payment of the necessary fee.

DETAILED DESCRIPTION

Figure 1:
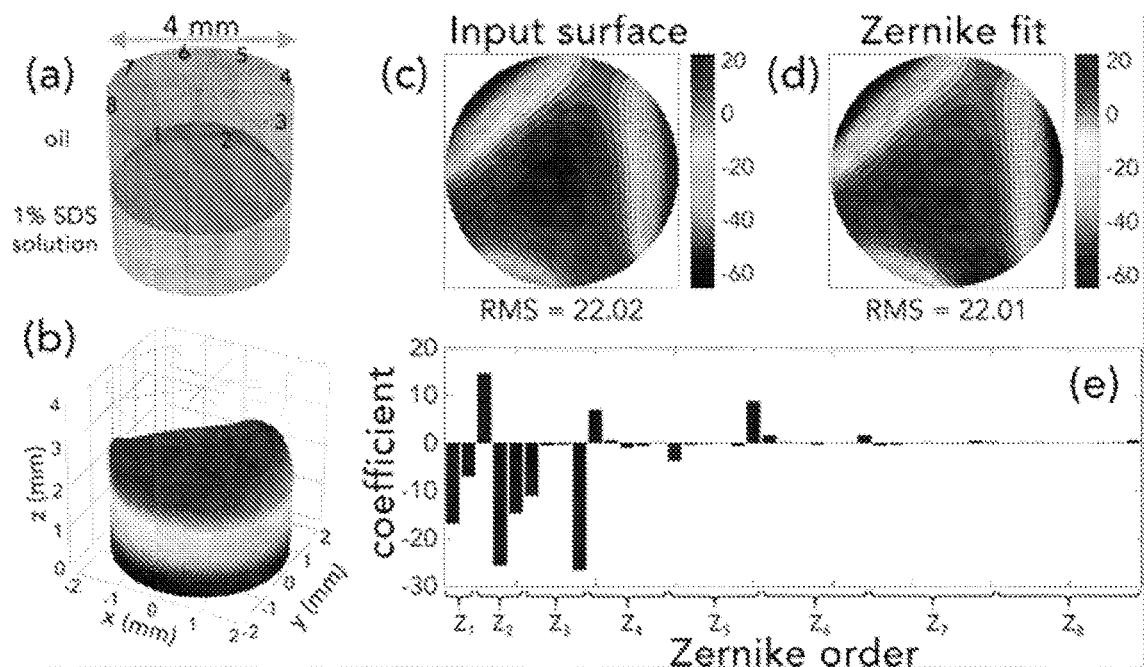
FIG. 1 is (a) a diagram of a simulation setup for 8-electrode device, specifically, a 4-mm diameter cylindrical device filled with 1% SDS solution and oil. The electrodes are labeled by numbers; (b) results of a simulation of the 8-electrode device after applying 28 V to electrode 2, 8, and 5, while keeping other electrodes at 18 V; (c) a contour plot of the liquid-liquid interface extracted from the simulation; (d) a diagram of Zernike polynomial least-squares fit and (e) a diagram of the corresponding coefficients of wavefront aberrations. In (b), (c) and (d), the maxima are toward the center of the graphs; the dark areas at the periphery denote minima.

Before the disclosed processes and materials are described, it is to be understood that the aspects described herein are not limited to specific embodiments, apparati, or configurations, and as such can, of course, vary. It is also to be understood that the terminology used herein is for the purpose of describing particular aspects only and, unless specifically defined herein, is not intended to be limiting.

Throughout this specification, unless the context requires otherwise, the word "comprise" and "include" and variations (e.g., "comprises," "comprising," "includes," "including") will be understood to imply the inclusion of a stated component, feature, element, or step or group of components, features, elements or steps but not the exclusion of any other integer or step or group of integers or steps.

As used in the specification and the appended claims, the singular forms "a." "an" and "the" include plural referents unless the context clearly dictates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Wavefront Aberration Correction Using Adaptive Optical Elements Such as Multielectrode Electrowetting-Based Devices The present inventors have noted that, for both microscopy and atmospheric science, aberration correction can be performed by using feedback from wavefront sensing, and/or indirectly by optimizing the return signal. To address the problem of aberration, adaptive optics techniques have been developed to both characterize and correct wavefront aberrations. Current technologies typically include spatial light modulators (SLM) and deformable mirrors (DM). Recent studies show that deformable mirrors can improve the point-spread function, signal-to-noise, and imaging depth in multiphoton microscopy of the mouse cortex. In a telescope system, a spatial light modulator can be used as an adaptive optical element to correct atmospheric turbulence-induced aberrations. But the present inventors have noted that these known methods are complex, require significant power, are expensive, and can be bulky.

The present inventors have determined that an attractive alternative for aberration correction is offered by adaptive optical elements such as those based on an electrowetting principle. This principle allows the control of the shape of a liquid droplet or a liquid/liquid interface on a dielectric surface through an applied voltage. These devices are transmissive, compact, low power, and simple to fabricate. Such devices are often implemented in a cylindrical cavity filled with two liquids, where an applied voltage through dielectric changes the curvature of the liquid-liquid interface. Electrowetting-on-dielectric (EWOD) is a versatile technology, and devices have been used as variable focus lenses in cameras and microscopy, as optical switches, and as beam scanners. EWOD tunable lenses use a single electrode, while devices implemented for beam scanning (tunable liquid prisms) benefit from two or more electrodes. Extending device design to multiple electrodes enables generation of a custom surface shape at the liquid-liquid interface. Examples of such devices are described in International Patent Application Publication no. WO2015/112770, and U.S. Patent Application Publication no. 2017/0255003, each of which is hereby incorporated herein by reference in its entirety. As described herein, these devices can be used to correct a variety of both on- and off-axis aberrations in an optical system. The approach described herein demonstrates capability to implement multielectrode electrowetting devices to correct a large group of on- and off-axis aberrations using a very simple system.

Without intending to be limited to the results described, this specification presents a simple and versatile aberration correction system and methods for using it. In certain embodiments, the design includes two EWOD devices and a fixed lens. Implementing two multielectrode devices allows the creation of a wide variety of liquid-liquid interfaces to correct a large group of aberrations. The liquid-liquid interface of a multielectrode device can be modeled by solving the Young-Laplace equation. These modeled surfaces are validated against a full 3D computational fluid dynamics (CFD) simulations in COMSOL multiphysics (using the Laminar two-phase flow model). Next, the simulated surfaces are imported into Zemax to calculate the optical performance of the design, in particular, the wavefront aberration correction. To correct a given input aberration, the genetic algorithm was implemented to vary the voltages applied to the multielectrode device. The point-spread function in the optical design can be used as a feedback for the optimization algorithm in a closed loop. Thus, the disclosure demonstrates the ability to correct multiple input aberrations using one or more (e.g., two multielectrode devices). The results of correcting three different input aberration examples (including astigmatism, coma, trefoil, and higher order aberration terms) are discussed in detail and show large improvement in point-spread function and Strehl ratio, compared with the uncorrected cases.

Geometrical Configuration and Numerical Methods

The geometric configuration used in the simulation is based on actual EWOD lenses and prisms, such as those described in International Patent Application Publication no. WO2015/112770, as well as in R. D. Montoya et al., "Large extinction ratio optical electrowetting shutter," Optics Express, 24, 9660-66 (2016); S. Terrab et al., "Adaptive electrowetting lens-prism element," Optics Express, 23, 25838-45 (2015); and O. D. Supekar et al., "Enhanced response time of electrowetting lenses with shaped input voltage functions," Langmuir, 33, 4863-69 (2017), each of which is hereby incorporated herein by reference in its entirety. Two immiscible liquids (1% sodium dodecyl sulfate aqueous solution and oil) are placed in a glass cylinder. The bottom of the tube is bonded to a glass slide with an electrode. The configuration of such a device is modeled in COMSOL Multiphysics and shown in FIG. 1(a). The simulation, using time-dependent 3D CFD (the Laminar two-phase flow model in COMSOL multiphysics), is performed to evaluate the liquid-liquid surface interface. An example of an eight-electrode device is shown in FIG. 1(b). FIG. 1(b) shows the equilibrium surface after applying 28 V to electrodes 2, 8, and 5, while keeping other electrodes at 18 V. For visualization, simulation to validate the ability to correct both on- and off-axis aberrations [see FIG. 1(c)]. The wavefront can be decomposed into a set orthonormal Zernike polynomials. Zernike polynomials were used to perform a least-squares fit to the liquid-liquid interface extracted from the simulation. Initially, a larger set of Zernike polynomials had been used to repeat the least-squares fit, however, the wavefront RMS errors converged after using 44 Zernike polynomials. FIGS. 1(d) and (e) show the contour plot of the Zernike fit and the corresponding Zernike polynomial coefficients, respectively. The wavefront RMS errors are similar between the liquid-liquid surface extracted from the simulation and the Zernike polynomial fit. The simulation also shows the ability to correct both on- and off-axis aberrations, due to the broken symmetry around the device center. In addition to the time-dependent COMSOL simulation, the curvature of the meniscus between the two liquids has been modeled using the Young-Laplace equation (see, e.g., S.-L. Lee and Ch.-F. Yang, "Numerical simulation for meniscus shape and optical performance of a MEMS-based liquid micro-lens," Optics Express 16, 19995-20007 (2008). T. Sarpkaya, "Vorticity, free surface and surfactants," Ann. Rev. Fluid Mech. 28, 83-128 (1996); S.-L. Lee and H.-D. Lee, "Evolution of liquid meniscus shape in a capillary Tube," ASME J. Fluids Eng. 129, 957-965 (2007), each of which is hereby incorporated herein by reference in its entirety). The model is based on the energy minimization principle and does not account for any transient effects. By solving the Young-Laplace equation, one can describe the equilibrium shape of a liquid-liquid interface for a given initial and final condition. The partial differential equation (PDE) toolbox in MATLAB is used to solve the equation for the geometry shown in FIG. 1(a). The steady-state contact angles were experimentally determined (see O.D. Supekar et al., "Enhanced response time of electrowetting lenses with shaped input voltage functions," Langmuir, 33, 4863-69 (2017)) to be 155° with no applied voltage and 90° at 28 V. The contact angle, $\gamma$, variation versus the applied voltage is fitted to the Lippmann-Young's equation (see, e.g., K. Mishra, D. van den Ende, and F. Mugele, "Recent developments in optofluidic lens technology," Micromachines 7. 102 (2016), and G. Lippmann, "Relations entre les phénomènes électriques et capillaires," Ann. Chim. Phys. 5, 494 (1875), each of which is hereby incorporated herein by reference in its entirety) and used as a boundary condition in the Young-Laplace equation, $v \cdot (\nabla u/(1+|\nabla u|^2)^{1/2}) = \cos \gamma$, where u(x,y) is the liquid-liquid interface surface, v is the unit exterior normal, and $\gamma$ is the angle between the surface and the cylinder wall.

Figure 2:
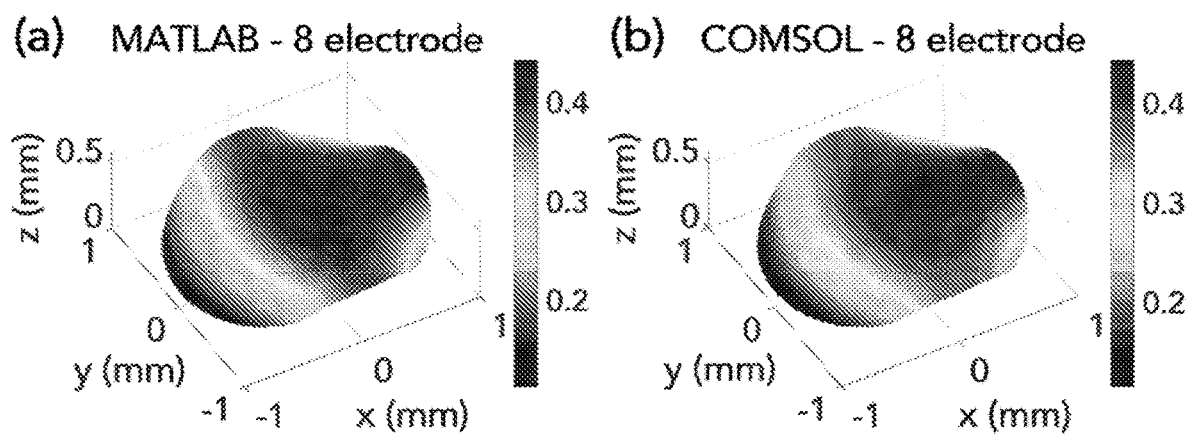
FIG. 2 is (a) a diagram of a liquid-liquid interface calculated by solving Young-Laplace equation in MATLAB for a 8-electrode device, 2-mm diameter, and voltage configurations, V=[28; 20; 28; 20; 20; 20; 28; 20] V, in which the colors represent the height of the liquid-liquid interface in mm; (b) a diagram of a liquid-liquid interface extracted from 3D computational fluid dynamics simulation in COMSOL for a similar device with the same voltage configuration, demonstrating that the two simulations agree well with each other. The residue of the two surfaces has a maximum relative error of 2% due to the two different meshes used in the simulations. The small differences are only at the edges of the circular meshes. In both (a) and (b), the maxima are toward the center of the graphs; the dark areas at the periphery denote minima.

Solving the Young-Laplace equation results in an equilibrium surface between the liquid-liquid interface. The surface is in good agreement with three-dimensional CFD COMSOL simulations, which validates the results. FIG. 2 shows an example of a surface extracted from the MATLAB and COMSOL simulation of an eight-electrode device with 2-mm diameter and voltage configurations of, V=[28; 20; 28; 20; 20; 20; 28; 20] V on the eight electrodes. The Young-Laplace and 3D CFD methods use different meshing parameters, and the residues of the two simulations for various voltage configurations are within ~2% at the edges, indicating good agreement. The two simulations match each other well in the center, with relative error of only 0.4% (numerical roundoff). To optimize the devices for aberration correction, one can solve the Young-Laplace equation numerically using the PDE toolbox in MATLAB, as this method is computationally efficient and allows for multiple iterations.

Figure 3:
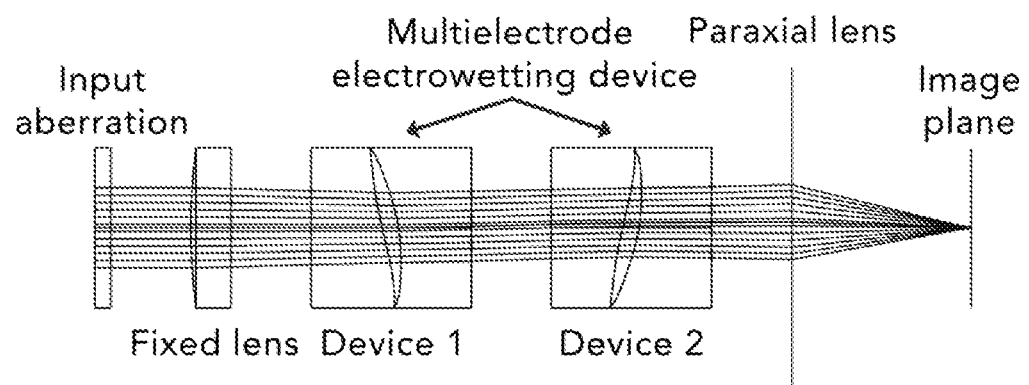
FIG. 3 is a schematic of an example of an optical design for wavefront aberration correction, using two multielectrode EWOD devices, preceded by a single fixed lens (effective focal length 16.6 mm). The liquid-liquid interface is imported into Zemax through the Zemax grid sag function. Next, ray tracing is performed on the imported surfaces. The corresponding Strehl ratio and imaging efficiency p are evaluated at the image plane. The fitness function, fitness=$\sqrt{(1-STRH)^2+1-IMAE^2}$, is used as feedback for the genetic algorithm in MATLAB. STRH: Strehl ratio. IMAE: Imaging efficiency. Imaging efficiency ensures that the input rays are not eliminated in the optimization process. Device 1 and 2 are two multielectrode devices in this design. In this example, device 1 and 2 are only two electrodes each in order to show the tilt caused by these devices. The liquid-liquid surface in this example corresponds to sidewall voltages of 20 and 25 V on device 1. The voltages are reversed for device 2.

One optical design for aberration correction using multielectrode EWOD devices is shown in FIG. 3 This design includes two multielectrode EWOD devices, preceded by a single fixed lens with an effective focal length of 16.6 mm. The fixed lens is used to remove the defocus aberration resulting from the two multielectrode devices. The two multielectrode devices are used to correct the aberration and the resulting wavefront is imaged using a paraxial lens. The input aberration is introduced to the system before the fixed lens, as labeled in FIG. 3. Using two multielectrode devices enables one to generate a more versatile liquid-liquid interface than from a single device, allowing one to correct a larger group of input aberrations. The schematic of this design with no input aberration is shown in FIG. 3.

The liquid-liquid interfaces extracted from Young-Laplace solution is imported to the multielectrode devices shown in FIG. 3. In this example, device 1 and 2 are only two electrode devices. Device 1 has sidewall voltages of 20 and 25 V. The sidewall voltages are reversed on the device 2. Lastly, a paraxial lens was included in the model to check the beam quality in the image plane. To correct a given input aberration, the liquid-liquid surface of each electrowetting device was modeled, using a set of random voltages. A genetic algorithm (GA) was used to determine the optimum voltages for a given input aberration. The calculated surfaces are imported into Zemax and the Strehl ratio of the optical setup (one measure of optical image quality) is evaluated, and used as a feedback to the genetic algorithm in MATLAB. The closed-loop optimization process determines the best sets of voltages that can correct the input aberrations at the imaging plane. In addition to Strehl ratio (calculated from the point spread function (PSF) in Zemax), the imaging efficiency of the design was also evaluated in order to ensure that the input rays are not eliminated in the optimization process (i.e. escape system due to a large tilt in the liquid-liquid interfaces). The fitness function used for the optimization is defined as, fitness=$\sqrt{(1-STRH)^2 + 1 - IMAE^2 2}$. STRH and IMAE are two operands in Zemax corresponding to Strehl ratio and imaging efficiency, respectively. A Strehl ratio of 1 corresponds to an aberration free, ideal optical system and imaging efficiency of 1 ensures that no rays are lost on the imaging plane. By minimizing the fitness function using the genetic aberration, one can determine the optimum sets of voltages to correct the given input aberration.

Results and Discussion

1. Astigmatism

Figure 4:
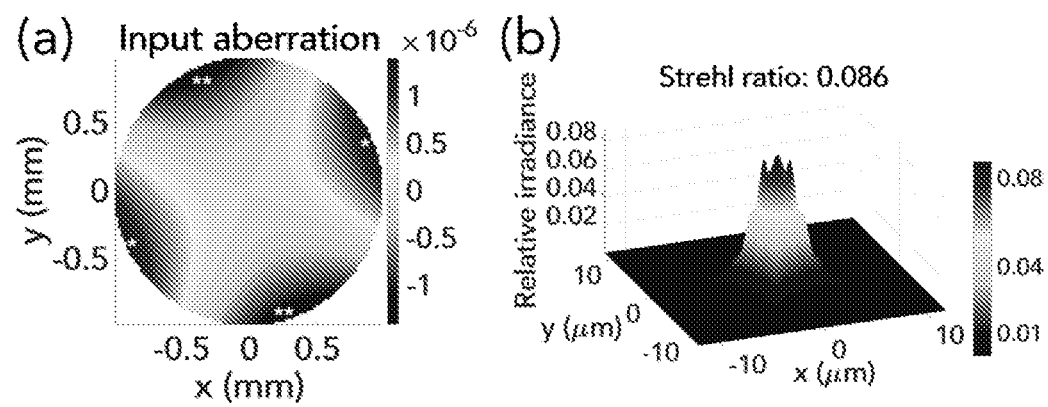
FIG. 4 is (a) a diagram of input aberrations composed of 0° and 45° astigmatisms with amplitude of 1 μm (1.57 waves at λ=633 nm); and (b) is the corresponding PSF after imaging the input aberration through a paraxial lens with a focal length of 2 mm. The Strehl ratio of an ideal diffraction limited beam is 1, however, the astigmatism introduced here results in a Strehl ratio of 0.086. In (a), single asterisks denote regions above zero, and double asterisks denote regions below zero.

Three different input cases containing multiple aberrations are studied. The first example uses astigmatism, one of the most common aberrations found in optical systems, corresponding to the fifth and sixth Zernike coefficients, with realistic values of astigmatism (1 µm, 1.57 wave at 633 nm for Z5 and Z6); the person of ordinary skill in the art will appreciate that this is reasonable assumption. Measurements carried out on the wavefront aberration of both eyes for a large population of human subjects found that astigmatism aberrations are below 0.5 µm. Multiphoton super-resolution imaging used to study aberrations through a polyacrylamide gel and a curved glass surface concluded that the astigmatism coefficients were smaller than 0.3 µm. More recently, astigmatism aberrations are studied and corrected in a single optofluidics devices with amplitudes up to 3 µm. FIG. 4 shows the result of imaging a wavefront with 0° and 45° astigmatism through a paraxial lens. The astigmatism results in a degraded Strehl ratio of 0.086 (an ideal diffraction-limited beam has a Strehl ratio of 1). The resulting distorted PSF does not allow for diffraction-limited focusing and degrades imaging contrast and resolution.

Figure 5:
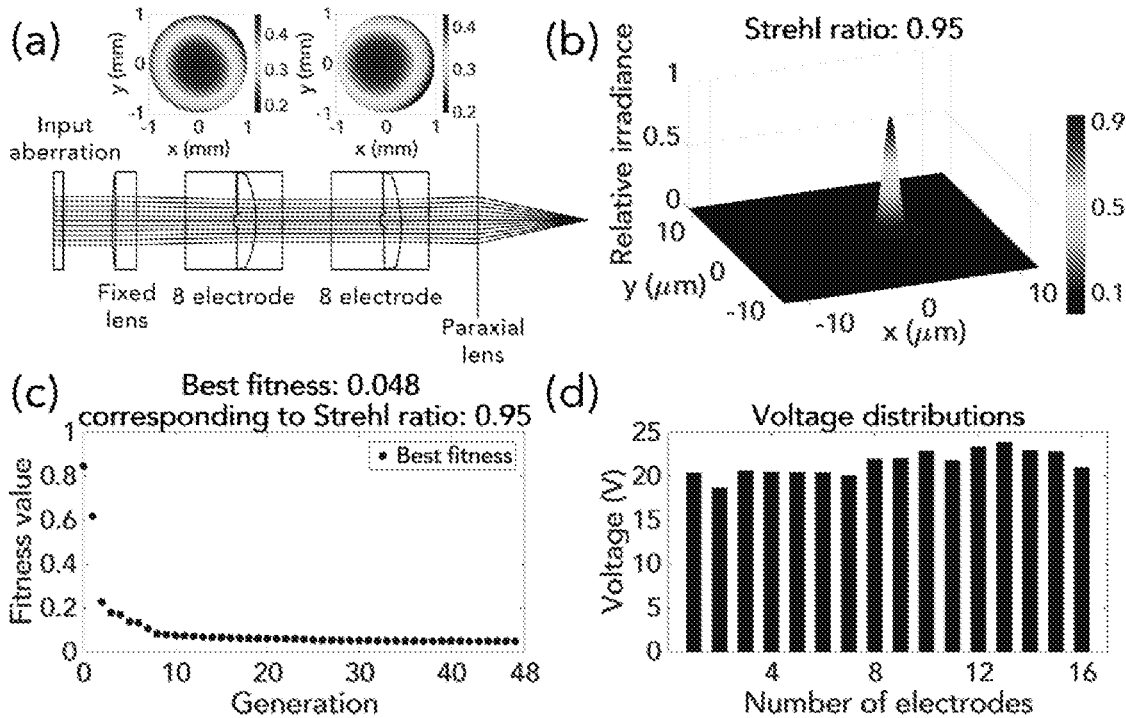
FIG. 5(a) is a diagram demonstrating a simulation in which astigmatism aberrations shown in FIG. 4 are used as an input for the optical design; the maximum is at the center; the dark region at the periphery is a minimum. After genetic algorithm optimization, the optimum liquid-liquid surfaces are shown for both 8-electrode devices.
FIG. 5(b) is a diagram demonstrating a simulation in which the corresponding PSF is plotted on the imaging plane with Strehl ratio of 0.95. The result shows good correction of the input aberration and reaches diffraction-limited performance.
FIG. 5(c) is a graph demonstrating evolution of the fitness score for every generation.
FIG. 5(d) is a graph of the corresponding optimum voltages after optimization are plotted versus electrode number for both devices.

Astigmatism aberration was used as an input to the optical design showed in FIG. 3. A 1-mm diameter beam is propagated through the optical design with a central wavelength of 633 nm. Two 8 electrode devices are implemented in the simulation. In order to find the best liquid-liquid surface to correct the input aberration, 16 voltages have to be optimized (two 8-electrode devices). The genetic algorithm population size of 40 with 45 generations has been used for the optimization. The result of the optimization process is shown in FIG. 5. The optimum liquid-liquid surfaces are shown on top of 8 electrode devices in the optical design schematic (see FIG. 5(a)). The PSF shows great improvement, compared with the case of FIG. 4(b). A Strehl ratio of 0.95 results in a nearly diffraction-limited beam. Evolution of the fitness score for every generation is shown in FIG. 5(c). The fitness score converges to zero, corresponding to a Strehl ratio and an imaging efficiency of one. The result demonstrates the imaging efficiency of one with a Strehl ratio of 0.95. The corresponding optimum voltages after optimization are plotted in FIG. 5(d) for both devices.

2. Random Aberrations: 7 Zernike Terms

Figure 6:
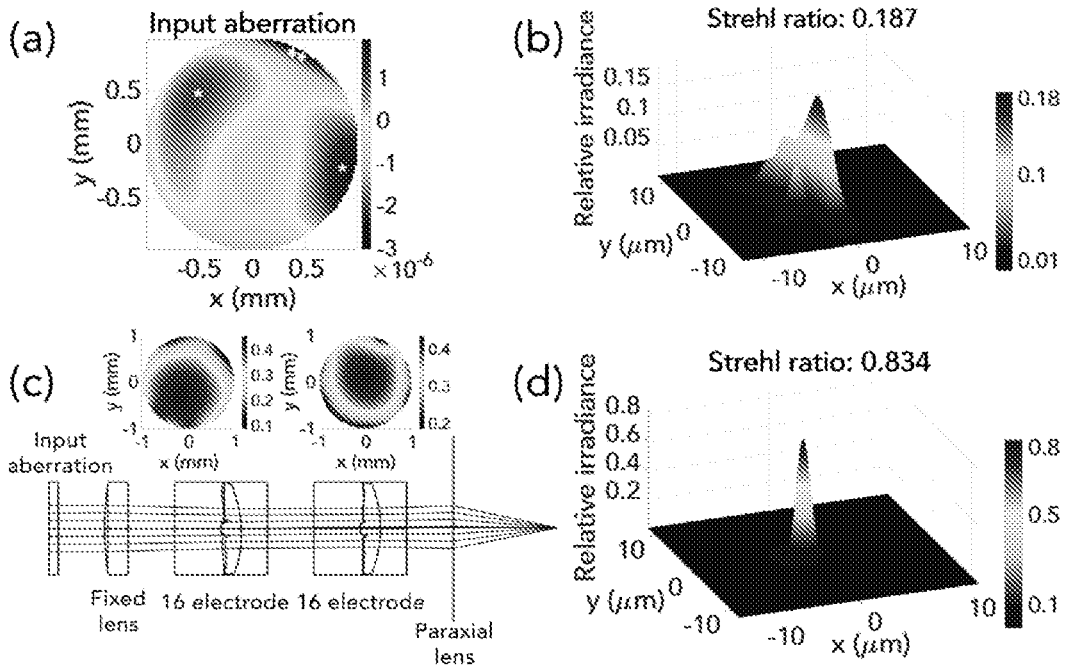
FIG. 6 is (a) a diagram of input aberration composed of two astigmatism, two coma, two trefoil, and one spherical aberration terms (Z5 to Z11) (single asterisks denote regions above zero, double asterisks denote regions below zero; (b) is a diagram of the corresponding PSF plotted after focusing through a paraxial lens with focal length of 2 mm with a Strehl ratio of 0.187; (c) is a diagram showing the optimum liquid-liquid surfaces for both 16 electrode devices (the maximum are at the centers; the dark regions at the peripheries are minima); (d) is a plot of the PSF on the imaging plane with Strehl ratio of 0.834. The Strehl ratio shows a significant improvement of the PSF.

In the second case, the power of this simple technique is demonstrated. Seven random Zernike terms are used as an input aberration, the fifth through eleventh Zernike coefficients, which includes: two astigmatism, two coma, two trefoil, and one spherical aberration term (does not include tip/tilt and defocus Zernike terms). The randomly generated Zernike terms were restricted in amplitude to ±1 µm, with values of, Z5:0.97, Z6: −0.88, Z7: 0.35, Z8: −0.64, Z9: −0.632, Z10: 0.74, and Z11: 0.34 µm. The results of adding up these Zernike terms are shown in FIG. 6(a). Propagating a 1-mm beam through this input aberration results in a PSF with a Strehl ratio of 0.187 as shown in FIG. 6(b). Such a poor PSF is a non-starter for two-photon microscopy. The optical design described in FIG. 3, in conjunction with GA optimization was used to correct this input aberration, using two 16-electrode devices. The resulting surfaces from GA optimization with a population size of 60, and 70 generation runs are shown in FIG. 6(c). The PSF is depicted in FIG. 6(d), with a Strehl ratio of 0.834 and imaging efficiency of one. The aberration correction method described herein thus shows significant improvement to the Strehl ratio. As described earlier, multiphoton microscopy has a strong dependence on the quality of the PSF of the scanning source. Thus, improving the PSF results in a stronger emitted signal and deeper scan depth. In this example, the emitted two-photon signal can be improved ~20 times (ratio of the Strehl ratio squared).

Figure 7:
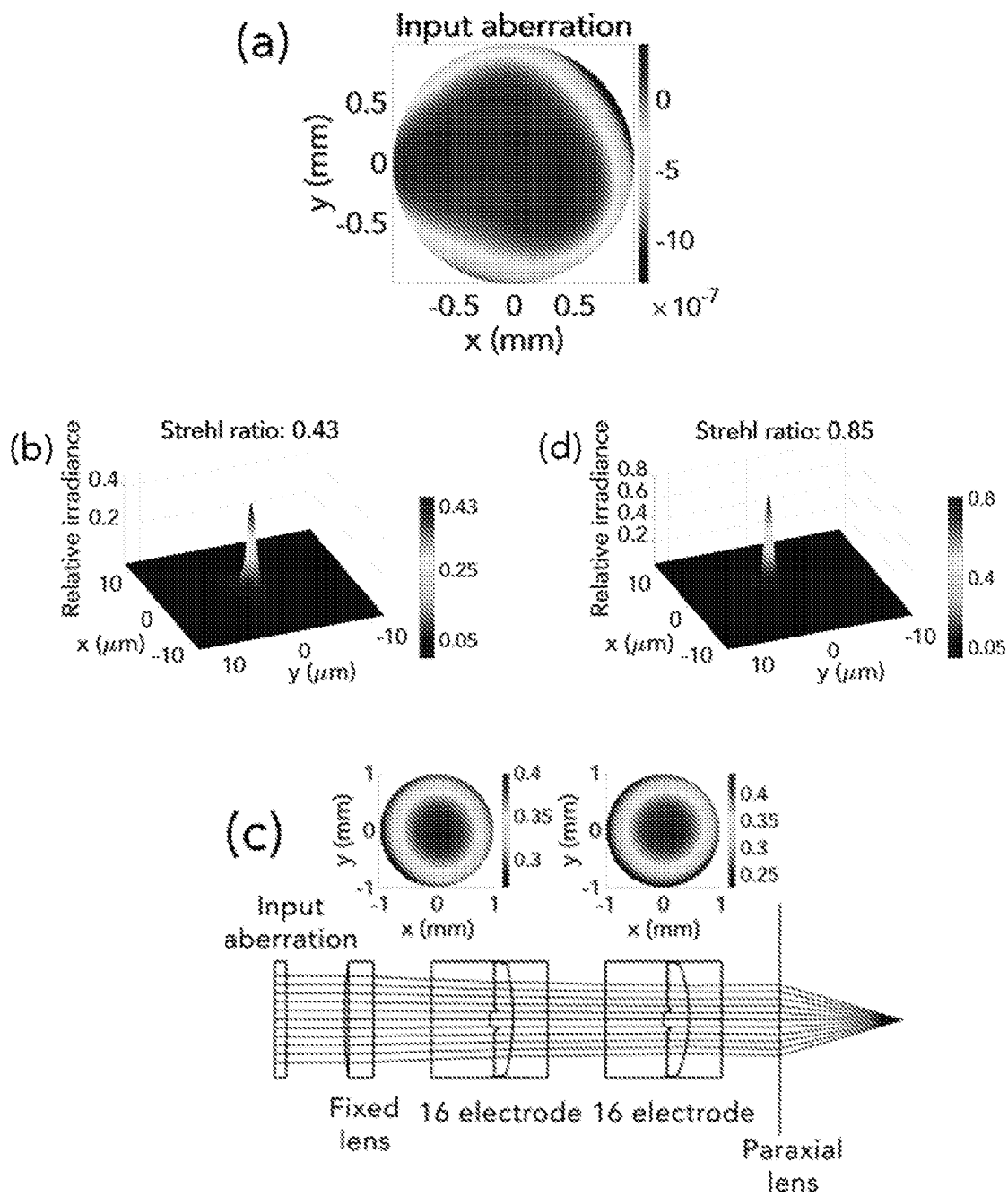
FIG. 7 is (a) a diagram of input aberration composed of tip, tilt, defocus, astigmatism, trefoil, spherical, secondary astigmatism, and quadrafoil terms (Z2 to Z14); The amplitudes are taken from Wang et al.'s measurements of a 2 μm fluorescence bead at −100 μm working distance [Red bars in FIG. 2(e)]; (b) is a diagram of the corresponding PSF is plotted after focusing through a paraxial lens with focal length of 2 mm with Strehl ratio of 0.43; (c) is a plot of the optimum liquid-liquid surfaces, shown for both 16 electrode devices; and (d) is a plot of the PSF on the imaging plane with Strehl ratio of 0.85. In all cases, the maximum are at the centers; the dark regions at the peripheries are minima.

3. Aberration of Gradient Index (GRIN) Lenses Used in Two-Photon Fluorescence Endomicroscope Imaging: 13 Zernike Terms Lastly, the design was examined using 13 Zernike terms from the measurement carried out by Wang at al. (C. Wang and N. Ji, "Characterization and improvement of three-dimensional imaging performance of GRIN-lens-based two-photon fluorescence endomicroscopes with adaptive optics," Opt. Express 21, 27142-27154 (2013), hereby incorporated herein by reference in its entirety) using a gradient index (GRIN) lenses in two-photon fluorescence endomicroscope imaging. The input aberration is extracted from red bars in FIG. 2(e) corresponding to measurements of a 2 µm fluorescence bead at −100 µm working distance]. The Zernike coefficients amplitudes were digitized and uses as an input in the simulation. The simulation is composed of tip, tilt, defocus, astigmatism, trefoil, spherical, secondary astigmatism, and quadrafoil terms (Z2 to Z14). Adding these terms results in an aberration depicted in FIG. 7(a). Propagating a 1.5 mm diameter beam through this aberration and focus it using a paraxial lens result in a Strehl ratio of 0.43, shown in FIG. 7(b). To correct the aberration, the GA optimizer was run, using two 16 electrode devices in the configuration shown in FIG. 3. The optimum solution is found using a genetic algorithm with population size of 60 and 50 generations. The best liquid-liquid surfaces of two 16 electrode device interfaces are plotted in FIG. 7(c). The cylindrical symmetry of these surfaces is broken due to the asymmetric input aberrations. The corresponding PSF on the imaging plane is graphed in FIG. 7(d) with an improved Strehl ratio of 0.85. The results show that adaptive electrowetting technology with multiple electrodes, as well as similar devices, can be used to compensate for aberrations of a GRIN lens and extend the depth of focus in brain tissue imaging.

Figure 8:
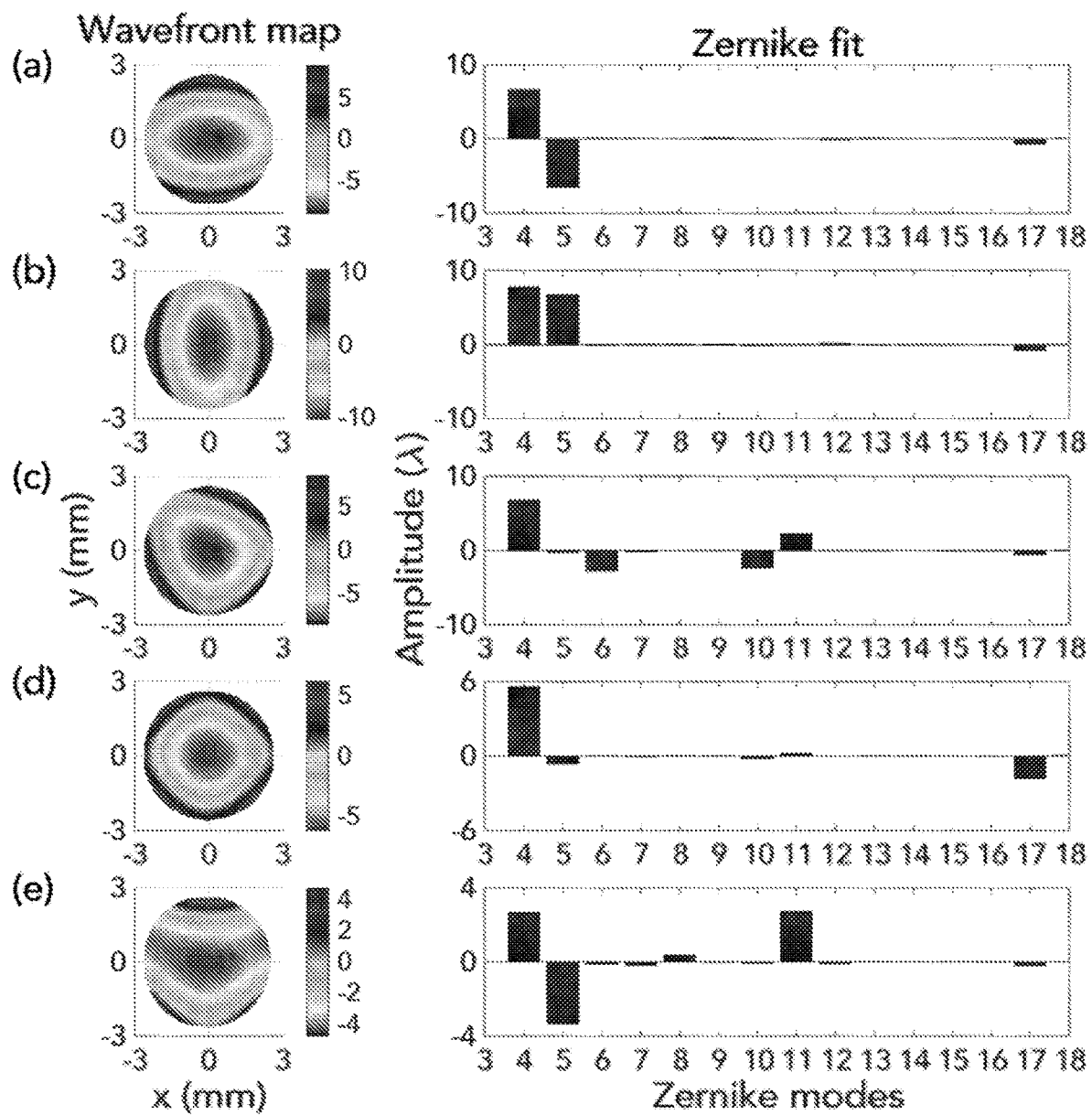
FIG. 8 provides a set of diagrams of induced wavefront aberration from an eight-electrode electrowetting device and the resulting Zernike fit. In all cases, the minima are at the centers; the dark regions at the peripheries are maxima.

These simulation results have been validated experimentally. The experimental set up uses a glass tube, with inner diameter of 8 mm filled with 1 wt % sodium dodecyl sulfate solution and dodecane, fabricated as described below, to demonstrate the formation of custom-shaped liquid/liquid interfaces. The liquid-liquid interface is characterized using a commercial Shack-Hartmann wavefront sensor (SHWS) [HASO4, Imagine Optic]. A collimated beam (wavelength 650 nm) is imaged onto the SHWS, with a Strehl ratio of 0.96. Next, an eight-electrode EWOD (electrowetting on dielectric) device is added into the in the beam path. Aberration is induced by applying voltages to each individual electrode. Applying 35 V corresponds to a contact angle of 90°, where the initial contact angle is 155° with no applied voltages. FIG. 1(a) shows the top view of the electrode configuration of the eight-electrode device used in the experiment. By applying 35 V to all electrodes, a flat surface can be generated. This technique can be used to accurately determine the voltage needed for a 90° contact angle. The tip/tilt aberration is ignored in this study, as it is caused by small misalignment of the beam with respect to the SHWS. Presented here are five examples of different voltage configurations that have been applied to the eight-electrode device, together with measurements of the corresponding induced aberration measured. FIG. 8(a) shows the first example: 35 V applied to electrodes 4 and 8, while other electrodes are kept at 0 V. The imaged wavefront clearly shows the induced aberration from the liquid-liquid interface. The wavefront map was fitted to the 37 Zernike polynomials, but for simplicity only the first 18 Zernike modes are plotted. The tip/tilt (Z1 and Z2) terms are neglected. The largest contributions correspond to defocus (Z4) and astigmatism (Z5) aberrations with amplitudes of 6.6 and −6.5 waves. FIG. 8(b) shows the aberration induced by applying 35 V to electrodes 2 and 6 with the other electrodes at 0 V. The corresponding Zernike fit reveals 7.7 waves of defocus (Z4) and 6.7 waves of astigmatism (Z5) aberration. FIG. 8(c) shows the example in which the induced aberration has a broken symmetry. This is induced by applying 35 V to electrodes 2, 5 and 8 and 0 V to the other electrodes. The significant Zernike terms consist of defocus (Z4), astigmatism (Z6), trefoil at 0° (Z10), and trefoil at 90° (Z11) with values of 6.7, −2.7, −2.3 and 2.25 waves, respectively. In the next example, electrodes 2, 4, 6, and 8 are at 35 V, while the other electrodes are at 0 V, as shown in FIG. 8(d). Alternating the voltages on the electrodes results in a symmetric induced aberration with Zernike values of 5.6 and −1.8 waves corresponding to defocus (Z4) and tertrafoil at 0° (Z17) aberration terms. The last example in FIG. 8(e) demonstrates randomly generated voltages applied to the device with the configuration of V=[35, 20, 35, 0, 35, 35, 0, 35] V. This configuration results in a broken symmetry and multiple Zernike modes are required to fit the wavefront map with a large trefoil at 0° term of 2.7 waves. Multielectrode devices based on electrowetting are capable to correct large amounts of defocus and astigmatism aberration (up to 6 waves) as demonstrated here. Notably, the electrowetting devices described here lack moving parts, have low power consumption, and provide a circular aperture in a transmissive configuration, thus are highly desirable for integration into a wide variety of optical systems.

Figure 9:
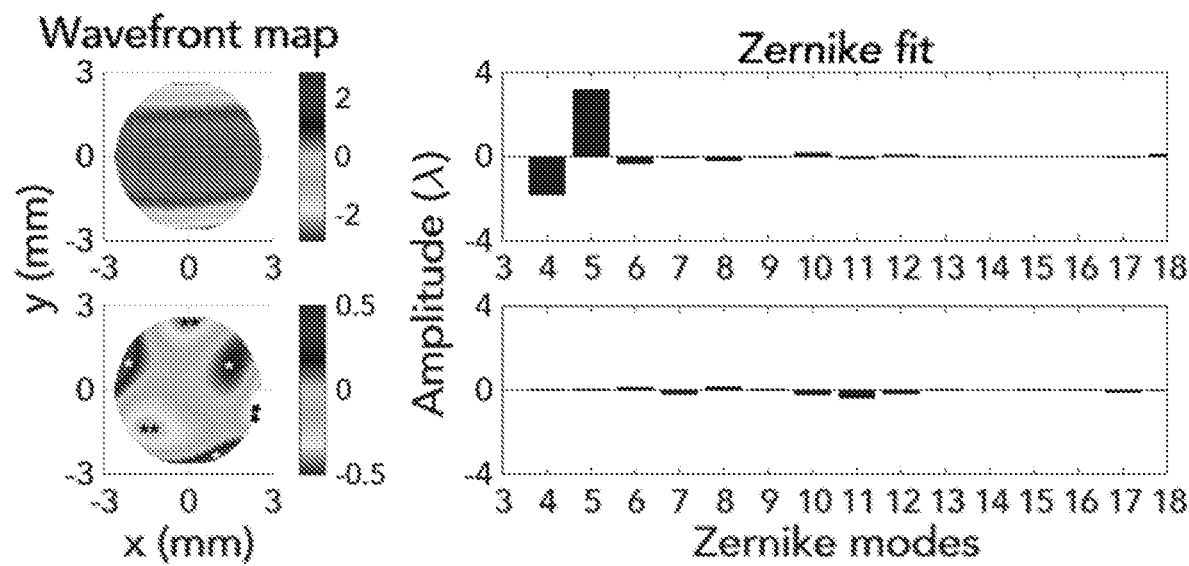
FIG. 9 provides (top) the measured wavefront map from a cylindrical lens and (bottom) the wavefront after correction using an eight-electrode electrowetting device with voltage configuration, V=[26.7, 26.2, 32, 35, 26.7, 26.2, 32, 35] V. In the top-left intensity plot, the maximum is the horizontal band in the center, with intensity decreasing in the vertical directions. In the bottom-left intensity plot, single asterisks denote maxima (above zero) and double asterisks denote minima (below zero).

The eight-electrode device is further characterized by implementing it in an active aberration correction configuration setup. To do so, a cylindrical lens is added to the beam path to induced aberration. The cylindrical lens induces 3.175 waves of astigmatism (Z5) and −1.8 waves of defocus (Z4) as shown in FIG. 9 (top) with RMS wavefront of 1.74 waves. The voltages of the eight-electrode device are then adjusted to compensate for the input astigmatism aberration in an iterative way. In principle, this can be done more efficiently by implementing a closed-loop feedback search algorithm. However, in a simple aberration case such as only astigmatism, one can find an optimum voltage configuration by systematically varying the voltages on each electrode. The optimum voltages in this example are found to be, V=[26.7, 26.2, 32, 35, 26.7, 26.2, 32, 35] V. The corresponding wavefront imaged on the SHWS is shown in FIG. 9 (bottom) with RMS wavefront of 0.19 waves. The Zernike fit shows a great improvement in reducing defocus and astigmatism aberrations with all the Zernike modes amplitude below 0.5 waves. This can be further improved by using a search algorithm.

Conclusion

Numerical simulations were performed to investigate the ability to correct wavefront aberrations using multielectrode EWOD devices. A full 3D computational fluid dynamics (CFD) simulation (using the Laminar two-phase flow model in COMSOL) predicted the equilibrium shape of eight and sixteen electrode EWOD devices. In addition, the Young-Laplace equation was solved in MATLAB to describe the equilibrium shape of a liquid-liquid interface for a given initial and final condition. The liquid-liquid interface from 3D CFD calculation is compared with the Young-Laplace solutions and the results show good agreement. To investigate the ability to correct wavefront aberrations, a new optical design is constructed using two multielectrode EWOD devices and the liquid-liquid surfaces were imported into Zemax, an optical design program. The PSF is evaluated through ray tracing in Zemax. A genetic algorithm was used to optimize the liquid-liquid interface by using a Strehl ratio and imaging efficiency as a feedback and studied three different input aberration cases. The first case includes an astigmatism with 2 Zernike terms as an input aberration. It was possible to correct the input aberrated wavefront and improve the Strehl ratio from 0.086 to 0.95. In the second example, 7 random Zernike terms were determined as an input aberration with amplitudes ±1 μm and show that the aberration can be corrected using two 16 electrode EWOD devices. Lastly, 13 Zernike terms, taken from the measurement reported by Wang et al. on off-axis aberration caused by GRIN lenses in two-photon fluorescence endomicroscope imaging at −100 μm depth, were studied. The results demonstrate a Strehl ratio of 0.85 after genetic algorithm optimization, using two 16 electrode EWOD devices. Experiments were performed using an eight-electrode device to demonstrate the generation of custom wavefronts and to correct aberration in a simple optical system.

Thus, the benefits of implementing a multielectrode EWOD device as an adaptive optical element for aberration correction and beam shaping in optical systems have been demonstrated. These devices are capable of correcting multiple low and high-order aberrations and can be realized in a variety of sizes with a large number of electrodes. The demonstration of multielectrode adaptive optical elements based on electrowetting principle for aberration correction shows the potential of this technology. Implementing this technology to improve the wavefront through a random scattering medium in important in various area of research such as nanosurgery, imaging, fiber-optics technique, microscopy, and astronomical applications.

Description of Various Embodiments

The materials and methods included herewith are intended to describe certain features according to various embodiments and aspects of the disclosure. However, the description provided herewith, especially the foregoing description of simulation studies, is not intended to be limiting in any particular aspect. As the person of ordinary skill in the art will appreciate, various modifications can be made to the particular systems and methods described herein without departing from the scope of disclosure. For example, well known optical components and techniques can be used to provide the desired properties to the overall optical assembly; to streamline the adjustment of the optical assembly; to perform any necessary data analysis; and to otherwise configure and operate the devices described herein.

This disclosure relates in certain aspects to methods for systems for imaging objects using an imaging system that incorporates one or more adaptive optical elements. One particular use for the methods and systems described herein is for imaging a tissue in a living subject (especially when used in conjunction with miniature fiber-optic imaging systems described in International Patent Application Publication no. WO2015/112770), in which the methods and systems described herein can help to correct aberrations imparted to the wavefront of the imaging radiation as it passes through the tissue, Particular examples of applications include two-photon imaging and fluorescence imaging (e.g., of brain tissue or lung tissue). The imaging systems and methods described herein can also be used in a variety of other applications, for example, in microscopy, medicine, atmospheric study, astronomical study, and other scientific research.

Accordingly, one aspect of the disclosure is a method of imaging an object. The method includes providing an optical imaging system comprising a source of incident radiation, an optical assembly comprising one or more adaptive optical elements, the optical assembly being disposed in a beam path between the source of radiation and the object, and a photodetector disposed so as to detect transmitted radiation resulting from the interaction of the incident radiation with the object; illuminating the object with incident radiation from the source of radiation through the one or more adaptive optical elements; receiving transmitted radiation from the object at the photodetector to provide a base image; and performing the following steps one or more times: adjusting the one or more adaptive optical elements, the adjustment including modifying an optical transfer function of the one or more adaptive optical elements, and receiving transmitted radiation from the object at the photodetector to provide an adjusted image; wherein the adjustment and receiving steps are performed until the adjusted image has substantially reduced aberrations compared to the base image. The adjustment and receiving steps can be performed using one or more of the techniques described herein, especially with respect to the study above.

Figure 10:
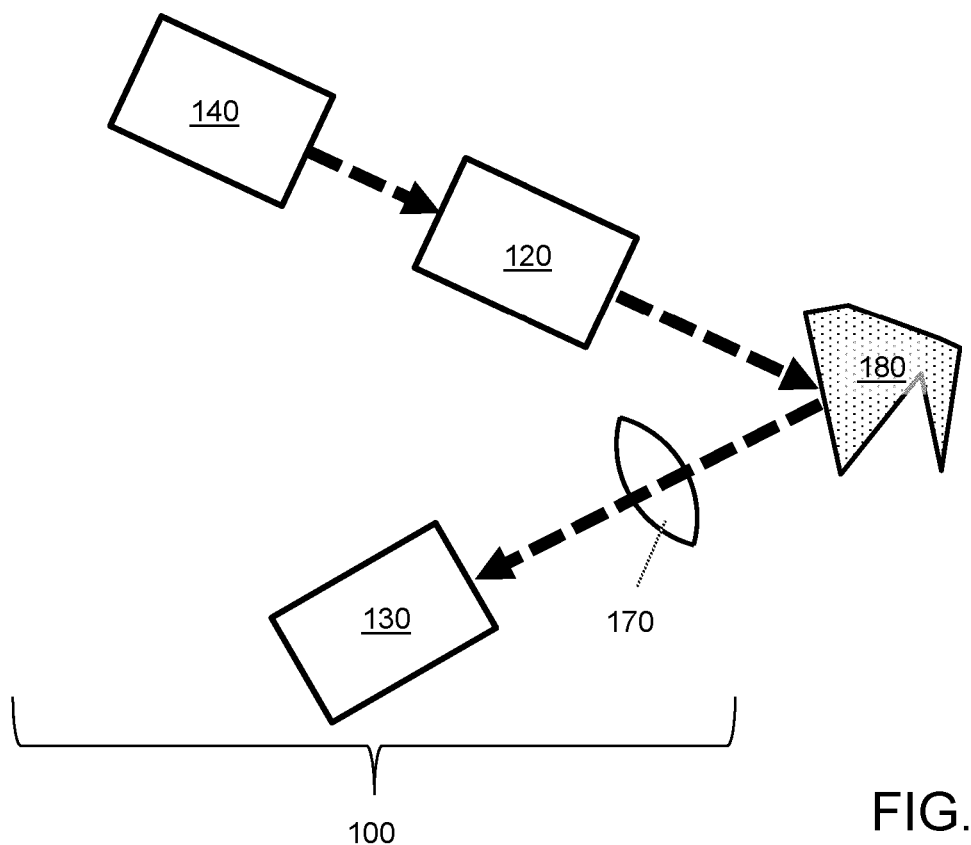
FIG. 10 is a block diagram of an optical system suitable for use in a method of the disclosure.

A block diagram of an optical imaging system is provided in FIG. 10. Here, in optical imaging system 100, optical assembly 120 is disposed in a beam path between source of incident radiation 130 and object 180. Photodetector 130 is disposed so as to detect transmitted radiation resulting from the interaction of the incident radiation with the object. This can be, for example, incident radiation reflected from the object, incident radiation transmitted (or not) through the object (i.e., for a system working in transmission), or fluorescence or phosphorescence resulting from interaction of the incident radiation with the object. As the person of ordinary skill in the art will appreciate, additional imaging optics (like lens 170 in the system of FIG. 10) can be provided in the system to focus radiation as necessary for imaging; these can be, for example, passive optics. The system described with respect to FIG. 10 can address aberration by shaping the incident radiation such that aberrations in the transmitted radiation, and thus the eventual image, are reduced.

Figure 11:
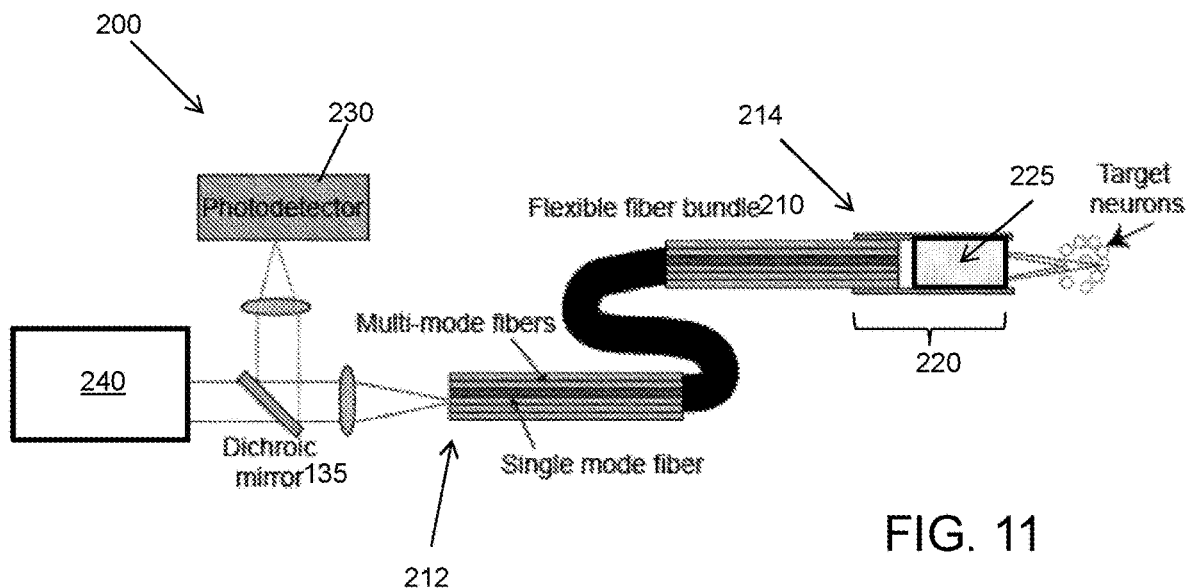
FIG. 11 is a schematic view of an optical system suitable for use in a method of the disclosure.

In certain such embodiments, the transmitted radiation received from the object at the photodetector can be received through the optical assembly. Such a system is shown in the schematic view of FIG. 3. Another example of such a system is the system described in International Patent Application Publication no. WO2015/112770. One embodiment of such a method is illustrated schematically in FIG. 11. Optical imaging system 200 includes a flexible lightguide (e.g., a flexible fiber bundle or a dual-clad fiber) 210, which has a first end 212 and a second end 214. The first end 212 of the flexible lightguide 210 is optically coupled to the source of radiation 240. The optical imaging device further includes an optical assembly 220 comprising a first adaptive optical element 225, attached to and optically coupled to the second end 214 of the flexible lightguide. Also included is a photodetector 230 optically coupled to the first end of the lightguide, as well as additional unnumbered focusing optics. The embodiment shown in FIG. 11 is configured for fluorescence microscopy, so a dichroic mirror is used to reflect transmitted (fluorescence) radiation to the photodetector. But the person of ordinary skill in the art will appreciate that other embodiments are possible; for example, an illumination fiber of a fiber bundle can be separated from the rest of the bundle at first end 212 in order to allow for the fibers of the rest of the bundle to be coupled to a photodetector. Such systems can be used, for example, to image a variety of tissues in human and other subjects. The flexible lightguide can be inserted into a subject (e.g., into a natural cavity or through an incision) so that the optical assembly 220 is disposed in a vicinity of tissue that is to be imaged. The flexible lightguide allows the optical assembly to reach the vicinity of tissue to be imaged. For example, the optical assembly could be disposed in the range of 0 to 1000 μm from the tissue, e.g., in the range of 0 to 500 μm, or in the range of 0 to 100 μm. The tissue may be any organic tissue in the subject, such as an organ. For example, the tissue may be part of the nervous system, such as the brain, the cardiovascular system, such as the heart or arteries, the musculoskeletal system such as a bone, the lymphatic system, the urinary system, the digestive system, a reproductive organ or a sensory organ.

In the optical systems described above, the optical assembly having the one or more adaptive optical elements is in the beam path between the source of incident radiation and the object to be imaged. However, this is not necessary. In other embodiments, the optical assembly having the one or more adaptive optical elements is in the beam path between the object to be imaged and the photodetector. In such embodiments, the system can address aberration by shaping the transmitted radiation to reduce aberrations in the detected image. One embodiment of such a method includes providing an optical imaging system including an optical assembly comprising one or more adaptive optical elements: and a photodetector disposed so as to detect transmitted radiation from the object, the optical assembly being disposed in a beam path between the photodetector and the object, and receiving transmitted radiation from the object at the photodetector to provide a base image; and performing the following steps one or more times: adjusting the one or more adaptive optical elements, the adjustment including modifying an optical transfer function of the one or more adaptive optical elements, and receiving transmitted radiation from the object at the photodetector to provide an adjusted image; wherein the adjustment and receiving steps are performed until the adjusted image has substantially reduced aberrations compared to the base image.

Figure 12:
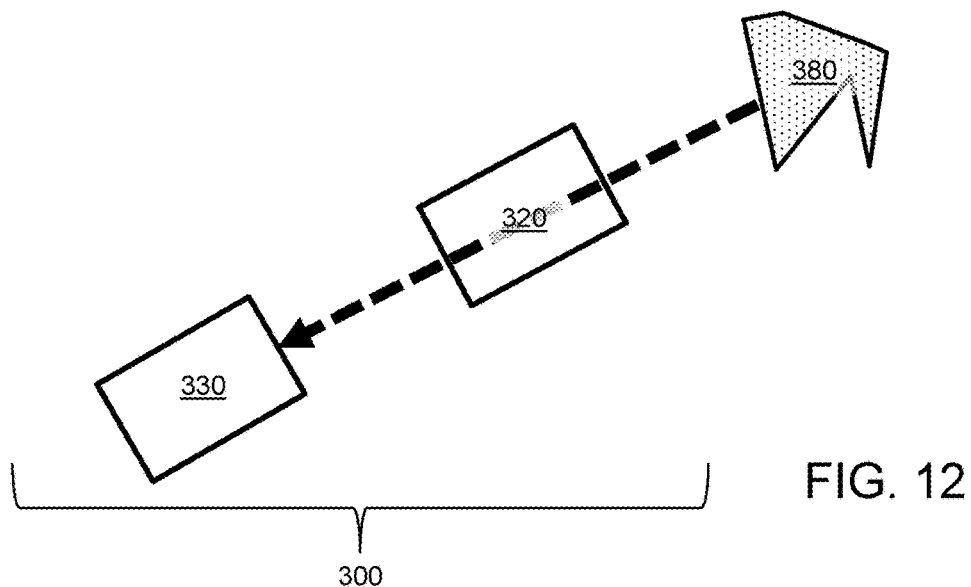
FIG. 12 is a block diagram of an optical system suitable for use in a method of the disclosure.

A block diagram of an example of a system for use in such a method is shown in FIG. 12. Here, light transmitted from object 380 is transmitted through optical assembly 320, and received at photodetector 330. The light transmitted from object 380 can come from a variety of sources. In certain embodiments (e.g., astronomical applications), the object itself is luminescent (e.g., a star). In other embodiments, light reflected from some other source of radiation is reflected off of the object 380. And in still other embodiments, the system further includes a source of radiation, configured to illuminate the object 380 with incident radiation.

In certain such embodiments, the incident radiation is received at the object at through the optical assembly. An example of such a system is discussed above with respect to FIG. 11.

In embodiments where both the incident radiation and transmitted radiation are operated on by the optical assembly, the optical assembly can reduce aberrations by changing both the incident radiation and the transmitted radiation.

The person of ordinary skill in the art will appreciate that the "optical assembly" of a system of the disclosure can be provided in a single unit, or a plurality of units throughout the system. In certain desirable embodiments, an optical assembly includes a plurality of adaptive optical elements, e.g., two, or three. The person of ordinary skill in the art will appreciate that the optical assembly can also include other optics (e.g., passive optics), as desired to provide desired focal properties to the system, for example, one or more collimating, focusing, or objective lenses.

In certain embodiments, an optical system (e.g., as otherwise described above) suitable for use in the methods described herein has an optical assembly that includes a first adaptive optical element and a second adaptive optical element. Notably, the first adaptive optical element has opposite overall focusing/beam steering properties as compared to the second optical element. That is, in such embodiments, if the first adaptive optical element acts to generally focus radiation transmitted in a particular direction, the second adaptive optical element is adapted to generally defocus radiation transmitted in that direction. Similarly, if the first adaptive optical element acts to generally focus radiation transmitted in a particular direction, the second adaptive optical element is adapted to generally defocus radiation transmitted in that direction. And if the first adaptive optical element acts to generally steer transmitted radiation one way, the second adaptive optical element is adapted to generally steer it in the opposite way. The subtraction of such effects can be substantially complete, or substantially incomplete (e.g., so that some of the effect remains to, e.g., steer or (de)focus the beam. The present inventors have determined that such a system can provide for a high degree of aberration correction while maintaining a generally desirable level of focus for the overall system. Moreover, such subtractive or partially subtractive configurations allow for overall optical transforms that are difficult to achieve otherwise. For example, some adaptive optical elements have an overall convex or concave shape (e.g., the electrowetting devices described below); when such adaptive optical elements are used, they can be configured such that the concavity or convexity of the first adaptive optical element is opposite that of the second adaptive optical element in a given beam direction. Such a system can include one or more additional optics (e.g., passive optics) to provide the system with an overall desirable range of focal lengths, and/or to provide additional aberration correction (e.g., correction of spherical aberration).

Figure 13:
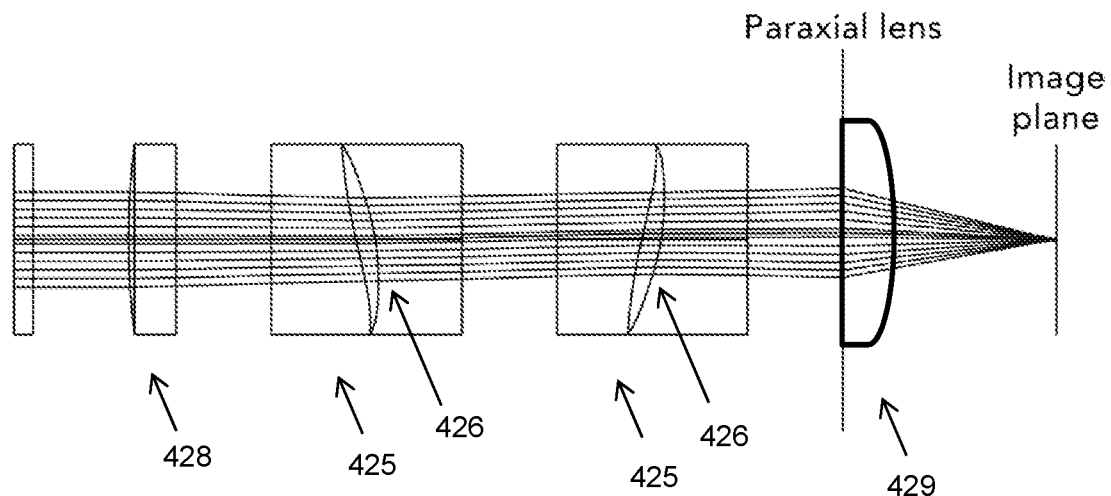
FIG. 13 is a block diagram of an optical system according to one aspect of the disclosure.

One embodiment of such an optical assembly is shown in schematic view in FIG. 13; the beam path is from left to right. The optical assembly 420 includes first and second adaptive optical elements (425a and 425b respectively, here electrowetting elements as described in more detail below). The optical assembly 420 also include a fixed lens 428 upstream of the elements 425a and 425b, and an objective lens 429 that focuses the light on the tissue at the image plane. By modifying the optical transform of both adaptive optical elements 425a and 425b, aberrations can be reduced; the use of a plurality of adaptive optical elements can allow for sensitive correction of aberrations over a wide range.

In certain desirable embodiments, the first adaptive optical element has an opposite gross optical transform as compared to the second optical element, as indicated by the generally opposing shapes in the boxes 425a and 425b. Many adaptive optical elements will have an overall tilt or lensing characteristic, as a result of their overall structure. As used herein, a "gross optical transform" relates one or more of tilt and focus, i.e., Zernike polynomials $Z_1^1$, $Z_1^{-1}$ and $Z_2^0$. This does not mean that the gross optical transforms be exactly opposite one another; rather, their directionalities are different (e.g., tilt left vs. tilt right; or focus vs. defocus).

The fact the gross optical transforms of the adaptive optical elements 425a and 425b can cancel one another out allows for sensitive correction of aberrations over a wide range without causing undesirable (de)focusing or shifting of the image.

The methods and systems described herein can be adapted to use a wide variety of adaptive optical elements. In certain embodiments, an adaptive optical element for use in the methods and systems described herein has at least three degrees of freedom, i.e., at least three independent adjustments that can be made to the optical transfer function performed thereby (e.g., at least three independent adjustments to the shape of the surface thereof). In certain embodiments, an adaptive optical element for use in the methods and systems described herein has at least six degrees of freedom, i.e., at least six independent adjustments that can be made to the optical transfer function performed thereby (e.g., at least six independent adjustments to the shape of the surface thereof). For example, in certain embodiments, each of the adaptive optical elements has in the range of 3-30 (e.g., 4-20, or 6-16) degrees of freedom (e.g., three, four, six, eight, ten, twelve, sixteen, twenty, twenty-four or thirty degrees of freedom). And in certain embodiments, the overall optical assembly has in the range of 6-40 (e.g., 10-40, or 10-25) degrees of freedom (i.e., the sum of the degrees of freedom of the individual adaptive optical elements in the assembly), for example, six, eight, ten, twelve, sixteen, twenty, twenty-four, thirty-two, or forty degrees of freedom.

In certain embodiments, each of the adaptive optical elements (e.g., a first adaptive optical element and, if present, a second adaptive optical element) has a surface having a modifiable shape. For example, as described in more detail below, each such adaptive optical element may be controlled by a plurality of input voltages that modify the surface to have a variety of different shapes. Notably, complex shapes can be provided. By modifying the shape of the surface of an adaptive optical element, it can be made to correct for a variety of different aberrations in any waveform passing therethrough. For example, the surface can be modified to address aberrations related to one or more, and desirably at least two, or even at least three, Zernike polynomials, such as astigmatism, coma, trefoil, higher order aberrations or a combination thereof. This can be especially powerful when there are two opposing adaptive optical elements as described above; the gross optical transforms (e.g., focusing/defocusing and/or beam-steering properties) of the adaptive optical elements can cancel one another out, leaving only the higher-order correction of aberration.

Of course, in other embodiments, the adaptive optical element(s) can provide focusing or beam steering to the overall system. As the person of ordinary skill in the art will appreciate, many adaptive optical elements (e.g., the electrowetting devices described herein) can provide desirable changes to the focal length and/or focal position, e.g., to allow for imaging at different depths and/or different lateral positions on or within an object. In embodiments where there are two opposing adaptive optical elements, one can provide a stronger focusing/steering than the other, such that the net effect is the desired degree of focus and/or steering. For example, the electrowetting devices described herein can be driven by a combination of applied voltages (e.g., different voltages at the different electrodes thereof) that allows the shape of the surface to be tuned. For example, the application of a voltage can tune the shape of an electrowetting element (e.g., where the surface is formed by the surface of the electrowetting liquid) to be varied (e.g., from less convex to more convex, from more concave to less concave, or even from convex to concave). And in certain embodiments, an adaptive optical element (e.g., an electrowetting element) can also be configured to provide tunable positioning of the focused beam (i.e., in a direction perpendicular to the optical axis). But the person of ordinary skill in the art will appreciate that these functions can be provided by different devices.

In embodiments of the method of the present disclosure, radiation is received by a photodetector. The person of ordinary skill in the art will appreciate that a wide variety of photodetectors can be used in the optical systems described herein. For example, in certain embodiments, the photodetector is a camera. In other embodiments, the photodetector is a multipixel image sensor such as a CCD or a CMOS sensor. In other embodiments, the photodetector is a light-sensitive film.

A variety of optical radiation sources can be used in conjunction with the systems and methods described herein. In certain embodiments, the radiation is in the range of visible to infrared, e.g., visible to near-infrared. In one particular embodiment, the radiation is infrared radiation. The radiation can be provided as continuous wave, or alternatively in a short pulse format. In certain embodiments, the source of optical radiation is a source of pulsed infrared radiation, e.g., having a pulse width in the range fs to ns. The radiation can be of substantially a single wavelength (e.g., centered at one particular peak wavelength), or, in other embodiments, of a plurality of different wavelengths (e.g., substantially of two peak wavelengths). For example, two lasers can be used to provide two different wavelengths. The wavelength range is flexible and, in certain embodiments, substantially covers the visible and near-infrared regions; the person of ordinary skill in the art will select the wavelength(s) desirable for a particular application. For example, in one embodiment especially useful in biological imaging, the radiation has a single peak wavelength in the range of 900-1000 nm (e.g., at about 925 nm). In another embodiment, two lasers are used to provide wavelengths of 816 and 1064 nm. In certain embodiments, a source of pulsed radiation provides pulses having a photon flux in the range of $10^6$-$10^8$ W/cm$^2$. In one embodiment, the source of pulsed radiation is a pulsed Ti:sapphire laser. Other sources can be used, e.g., fiber lasers. Of course, in other embodiments, continuous wave radiation can be used, from any convenient source, e.g., diode lasers, fiber lasers, light emitting diodes, etc. And, as described above, in certain embodiments the system includes no radiation source; it is radiation transmitted from the object to be imaged (e.g., provided by the object itself or reflected from another source) that is collected.

The person of ordinary skill in the art will appreciate that the devices and methods described herein can be used in conjunction with a wide variety of imaging methods. For example, the methods and devices described herein can be adapted for use with a variety of multiphoton processes such as, for example, coherent anti-Stokes Raman scattering (CARS), two-photon excitation autofluorescence (TPAF), second harmonic generation (SHG), third harmonic generation (THG) and stimulated Raman scattering (SRS). The person of ordinary skill in the art will appreciate that the devices and methods can also be used in a variety of single-photon based techniques, e.g., spectroscopic imaging techniques (e.g., Raman spectroscopy) or fluorescence imaging techniques. In such cases, the source of optical radiation can be, for example, a continuous wave source, e.g., a compact diode laser operating in the visible or near infrared.

Figure 14:
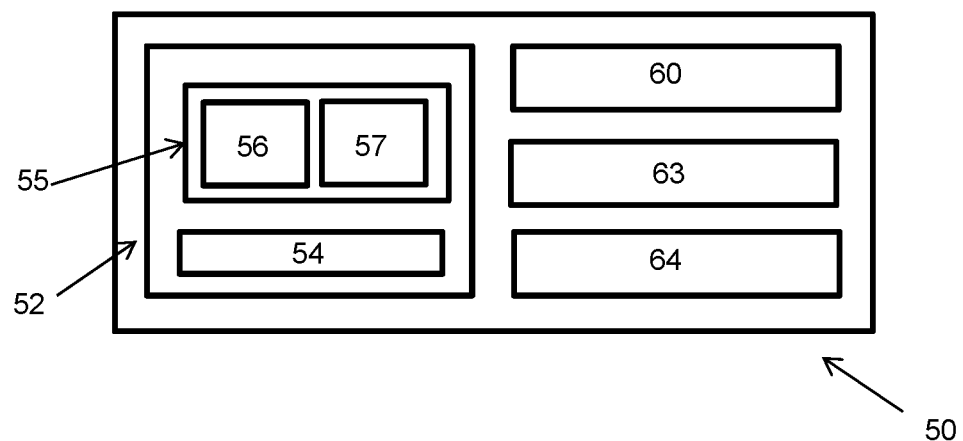
FIG. 14 is a schematic block diagram of an optical imaging system according to one embodiment of the disclosure.

As the person of ordinary skill in the art will appreciate, a computer-based controller can be used to perform the methods described herein. FIG. 14 is a schematic block diagram illustrating an optical imaging system 50 in accordance with an embodiment of the disclosure with such a controller 52. Some or all of the features of the optical imaging system 50 may be similar or identical to corresponding elements in the optical imaging system 100 shown in FIG. 1. For example, system 50 may also include a photodetector 63, an optional radiation source 64 and optical assembly 60. The controller 52 may include a processor 54 and a memory 55. The memory 55 may include a memory storage device containing program instructions 56 and, optionally, a three-dimensional model 57. The controller 50 can be configured to carry out various operations as described herein. For example, the controller may perform calculations assessing the impact on the output waveform of different adjustments of the optical assembly 60. Further, the controller may provide instructions to the optical assembly to make the corresponding adjustments.

The person of ordinary skill will appreciate, based on the disclosure herein, that the methods and systems of the disclosure can provide a high degree of aberration correction. For example, in certain embodiments as otherwise described herein, aberration in the image is substantially decreased with respect to at least two Zernike polynomials, e.g., at least two Zernike polynomials other than polynomials $Z_1^1$, $Z_1^{-1}$ and $Z_2^0$. In certain desirable such embodiments, aberration in the image is substantially decreased with respect to at least three Zernike polynomials, e.g., at least three Zernike polynomials other than polynomials $Z_1^1$, $Z_1^{-1}$ and $Z_2^0$.

The person of ordinary skill in the art will appreciate, based on the present disclosure, that the adjustment and receiving steps can be performed in a variety of ways. For example, in certain embodiments, an optical simulation is performed using the test image as a seed, and wherein the adjustment of the one or more adaptive optical elements is performed based on the optical simulation results. The optical simulation results can output a desired optical transform and/or a desired shape for the one or more optical elements, and the adjustment can be made to the adaptive optical element(s) accordingly.

For example, in one embodiment, the optical simulation includes determining a test waveform from the test image, conducting a plurality of iterations of simulating an adjustment of the one or more adaptive optical elements and computing an impact of the simulated adjustment of the optical assembly on the simulated waveform, and identifying an adjustment of the one or more adaptive optical elements that substantially reduces the aberrations in the simulated waveform. In one embodiment, the iterations may be carried out using a genetic algorithm. In such an embodiment, a set of values can be assigned to a characteristic aspect of the adaptive optical elements, such as a set of input voltages, to create a varied population of simulated adaptive optical elements. The performance of this population of simulated adaptive optical elements may then be assessed and a new generation of simulated adaptive optical elements can be generated based on the performance of the previous generation. After a number of generations, a correcting adjustment for the optical assembly can be identified. For example, the genetic algorithm may use a population size of at least 10 and iterate through at least 10 generations. For example, the genetic algorithm may use a population size in the range of 10-100, e.g., 20-80. Likewise, for example, the genetic algorithm may use in the range of 10-300 generations, e.g., 30-150 generations.

After the one or more adaptive optical elements are adjusted based on the simulation, another test image can be collected and used as the seed for another round of simulations. This simulation/adjust cycle can be performed until a desired aberration correction is achieved. Performing the simulation in separate steps, using actual measured images as described above, can shorten the time needed to provide a desired degree of correction. But in other embodiments, the simulation can be performed once, without intermediate sampling of an image; the simulation itself can provide an adjustment sufficient to provide substantial aberration correction.

The simulation can also or alternatively include other mathematical operations to determine the desired optical transform for the one or more adaptive optical elements. For example, in an embodiment in which an electrowetting device is used, the optical surface of the electrowetting device can be calculated based on input voltages by solving the Young-Laplace equation using a partial-differential equation tool, such as that in MATLAB. The surface may also be simulated in a computational fluid dynamics tool such as COSMOL and the impact of the change in the surface on the aberrations can be calculated using an optical tool, for example Zemax. Here, too, the calculations can be iterated to find surface shape (e.g., and associated input voltages) that reduces the aberrations.

But in other embodiments, the receiving and adjusting steps can be performed without using an optical simulation. Rather, the receiving and adjusting steps can be performed using the feedback of the received image itself. Here, too, a genetic algorithm can be used as described above; instead of simulating different optical transforms of the one or more adaptive optical elements, the one or more adaptive optical elements are iteratively adjusted, and the resulting images used in the genetic algorithm. In such an embodiment, a set of values can be assigned to a characteristic aspect of the adaptive optical elements, such as a set of input voltages, to create a varied population of adaptive optical elements. The performance of this population of adaptive optical elements may then be measured by receiving a series of images, and a new generation of adaptive optical elements can be generated based on the performance of the previous generation. After a number of generations, a correcting adjustment for the optical assembly can be identified. For example, the genetic algorithm may use a population size of at least 10 and iterate through at least 10 generations. For example, the genetic algorithm may use a population size in the range of 10-100, e.g., 20-80. Likewise, for example, the genetic algorithm may use in the range of 10-300 generations, e.g., 30-150 generations. But the person of ordinary skill in the art will appreciate that other image feedback methods can be used.

As described above, a variety of adaptive optical elements can be used in the methods and systems described herein. For example, in certain desirable embodiments, each of the adaptive optical elements is an electrowetting optical element, for example, a multielectrode electrowetting optical element. In certain desirable embodiments, each multielectrode electrowetting optical element has at least three, e.g., at least six independently-addressable electrodes. The person of ordinary skill in the art will appreciate, based on the present disclosure, that the electrodes can be individually addressed to flexibly change the shape of the optical surface of the electrowetting optical element.

In devices based on the electrowetting effect, forces from an applied voltage are used to shape a droplet of liquid. This effect can be applied to two immiscible liquids placed in a tubular aperture, where electrowetting causes a change in the curvature at the liquid-liquid interface; when the liquids have different refractive indices, this can result in a lens having, e.g., a tunable focal length. In a typical device, the liquid is placed in a cylindrical aperture with electrical contacts. Split electrodes inside the device can allow for operation as a prism or generation a custom surface shape. There are many choices for liquid combinations, with large spectral coverage. Device sensitivity to voltage can be enhanced with proper material choice and thickness of the dielectric layer. The attractive features of electrowetting optical devices include: transmissive geometry, small size, robustness and insensitivity to external mechanical forces, low operating voltages, fast response time, low insertion losses, large stroke and good optical quality.

Figure 15:
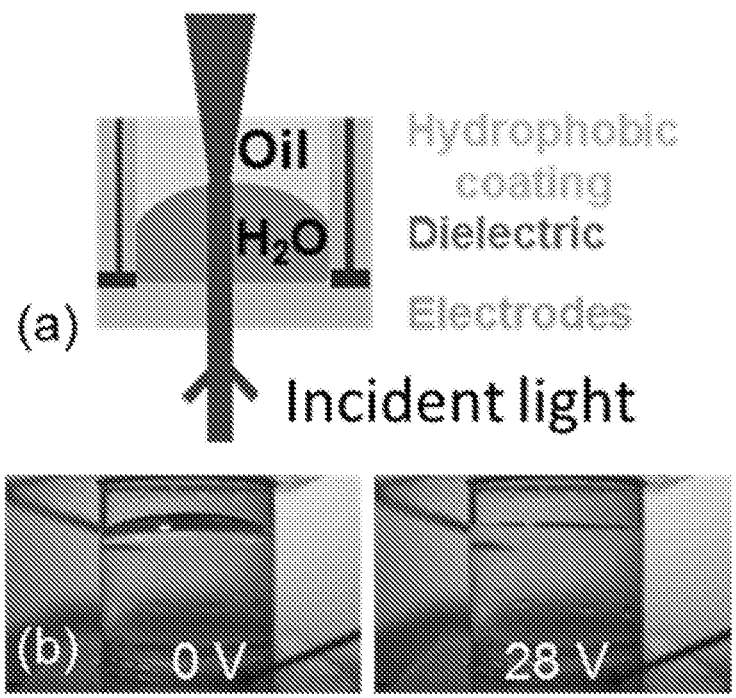
FIG. 15 provides a schematic diagram of an electrowetting optical element and a set of pictures of the optical element in operation.
Figure 16:
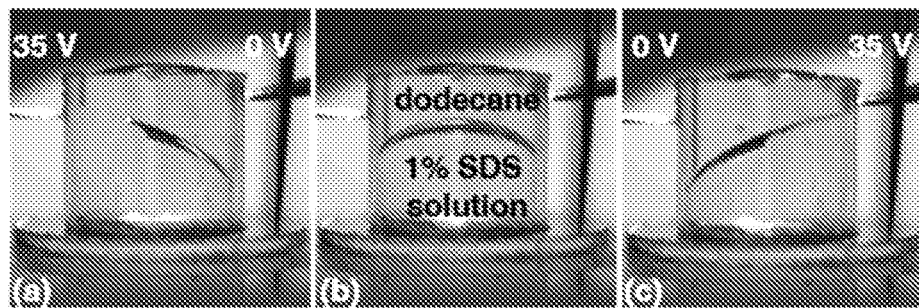
FIG. 16 provides a set of pictures demonstrating an electrowetting optical element in operation as a tunable prism.

For example, FIG. 15(a) shows a cross-sectional view of one example of an electrowetting liquid lens. A glass tube is coated with an indium tin oxide electrode, Parylene HT, and a Teflon hydrophobic coating. The substrate has an electrode and is bonded to the glass capillary tube. FIG. 15(b) provides a side view of the liquid lens tuning from a curved to flat with 28 V. FIG. 16 demonstrates an electrowetting device functioning as a tunable prism for use in scanning, (a) 35 V applied to the left sidewall, (b) device functioning as a diverging lens with no applied voltage, and (c) 35 V applied to the right sidewall.

Figure 17:
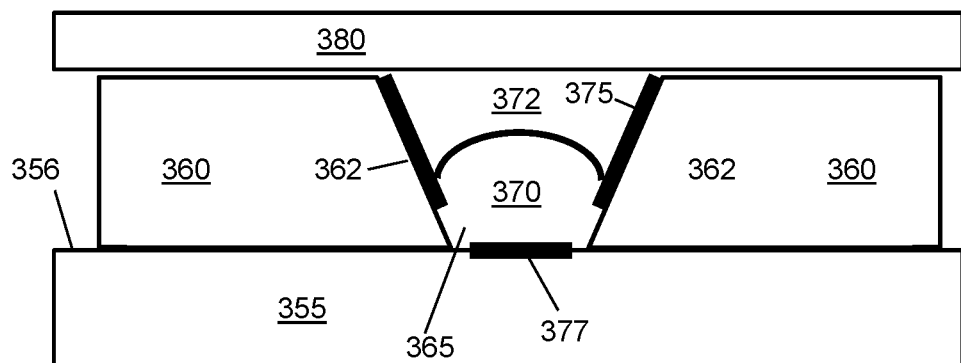
FIG. 17 is a schematic cross-sectional view of an electrowetting optical element according to one embodiment of the disclosure.

An embodiment of an electrowetting optical element suitable for use as a variable-focus lens element is shown in cross-sectional view in FIG. 17. Electrowetting optical element 350 includes a transparent substrate 355 having a surface 356. One or more sidewalls 360 extend from the surface of the substrate, the one or more sidewalls having surfaces (here, surfaces 362) that define a cavity 365. Two liquids are disposed within the cavity: a polar liquid 370 and a second liquid 372. The second liquid is immiscible with the polar liquid and has a different index of refraction than the first liquid (e.g., at the wavelength of the source of radiation). Thus, the polar liquid and the second liquid form two distinct liquid phases within the cavity. The second liquid is electrically insulating (non-polar). The device also includes one or more first electrodes 375 disposed along the sidewalls of the cavity (or on the internal surface of a top cover as described below); and one or more transparent second electrodes 377 electrically isolated from the first electrodes on the bottom of the cavity.

The one or more sidewalls can be formed at a variety of angles. For example, the one or more sidewalls can extend from the substrate such that they have an angle with the substrate no more than 20 degrees from normal, no more than 10 degrees from normal, or even no more than 5 degrees from normal. The one or more sidewalls can be formed from a variety of materials, for example, a polymer or a glass. The person of ordinary skill will appreciate that the sidewalls can be formed using a variety of techniques, e.g., molding, photolithography. 3D printing, and selective etching. In certain embodiments, a photodefinable polymer (e.g. an epoxy-based photoresist such as SU-8) is used. But in other embodiments, a tube, such a glass tube, is used to provide the sidewalls; as described below, through appropriate masking, the inside surface of a tube can be patterned with individually-addressable electrodes.

In certain embodiments, the electrowetting optical element further includes a transparent cover disposed over one or more sidewalls, the cover having a surface substantially closing the cavity. That is, in such embodiments the cavity can be substantially enclosed by the substrate, the cover, and the one or more sidewalls. The transparent cover is indicated by reference number 380 in FIG. 17. In certain embodiments, the one or more first electrodes are positioned on an internal surface of the cover instead of on the sidewalls. In other embodiments, the one or more first electrodes are positioned on an internal surface of the cover and on the sidewalls.

Figure 18:
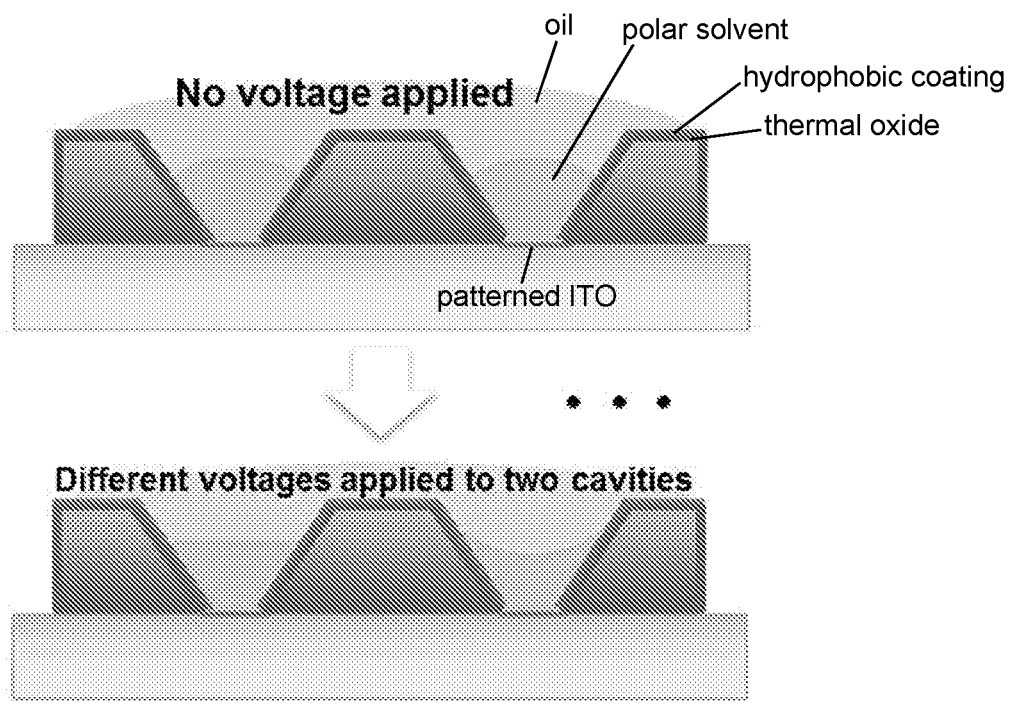
FIG. 18 is a schematic cross-sectional view of the operation of an electrowetting optical element according to one embodiment of the disclosure.

In certain embodiments, one or more voltage sources are coupled between the one or more first electrodes along the sidewalls of the cavity and the one or more second electrodes. The one or more voltage sources can be configured to apply a voltage between the one or more first electrodes and the one or more second electrodes, for example, at voltages in the range of up to 50 V, to individually address the electrodes and to modify the shape of the interface between the liquids (i.e., the optical surface of the electrowetting optical element). This is shown, as described in more detail below, in FIG. 18.

The sidewalls can have one or more dielectric coatings formed thereon. The total thicknesses of such coatings can be, for example, less than about 1 µm, less than about 500 nm, or even less than about 300 nm in thickness. Such coatings can be, for example, greater than about 10 nm in thickness. Conventional techniques such as atomic layer deposition and chemical vapor deposition can be used to form the one or more dielectric coatings. The one or more dielectric coatings can include, for example, aluminum oxide (e.g., $Al_2O_3$), silicon oxide (e.g., $SiO_2$), silicon nitride (e.g., $Si_3N_4$), silicon oxynitride, titanium dioxide (e.g., $TiO_2$), or a combination thereof. In other embodiments, parylene can be deposited by chemical vapor deposition. In one particular embodiment, the one or more dielectric coatings comprise a layer of aluminum oxide covered by a layer of silicon oxide or titanium oxide.

In certain embodiments, the surface of the cavity in contact with the polar liquid and the second liquid is substantially hydrophobic, e.g., having a water contact angle greater than about 50 degrees, greater than about 70 degrees, or even greater than about 90 degrees. For example, in certain embodiments, the surfaces of the sidewalls defining the cavity have one or more coatings formed thereon, wherein the outermost coating (i.e., contacting the polar liquid) of each is a substantially hydrophobic coating. In certain embodiments, the outermost coating of the one or more sidewalls comprises a substantially hydrophobic polymer (e.g., Teflon AF or parylene) or organically modified silicate (e.g., formed by an organic or fluorinated organic trifunctional silane) (e.g., total thickness less than about 500 nm, or even less than about 100 nm).

The person of ordinary skill will appreciate that the one or more electrodes can be disposed on the sidewalls in a variety of configurations. In certain embodiments, the one or more electrodes disposed along the sidewalls of the cavity are disposed between the sidewalls and any substantially dielectric and hydrophobic coatings. The electrodes can be formed from a variety of materials, e.g., copper, silver, gold, chromium, indium-tin oxide or zinc oxide. The one or more second electrodes can also be provided in a number of configurations. For example, the one or more second electrodes can be provided on the substrate. In other embodiments, the one or more second electrodes are provided on a cover. The electrodes can be formed and patterned using standard micro- and nano-fabrication techniques such as lithography, sputtering, thermal evaporation and chemical vapor deposition.

In certain embodiments, one or more of the sidewalls (e.g., each sidewall) has formed thereon an electrode layer (e.g., Cu, Ag, Au, ITO or ZnO); a layer of aluminum oxide (for example, $Al_2O_3$, e.g., deposited by ALD, for example, thickness in the range of about 20 nm to about 200 nm, e.g., about 100 nm); a layer of silicon oxide (for example, $SiO_2$, e.g., deposited by ALD, for example, thickness in the range of about 5 nm to about 100 nm, e.g., about 10 nm); and a hydrophobic coating (for example, a polymer or an organically modified silicate (e.g., formed by an organic or fluorinated organic trifunctional silane, for example having a thickness less than about 300 nm, less than about 200 nm, less than about 100 nm, or even less than about 50 nm)).

The polar liquid can take many forms. For example, in certain embodiments, the polar liquid is an aqueous liquid. The polar liquid can be, for example, aqueous ionic surfactant such as aqueous sodium dodecyl sulfate, or an aqueous solution of an ionic compound. Similarly, the second liquid can take many forms, as long as it is electrically insulating, immiscible with the polar liquid, of different refractive index from the polar liquid, and substantially density matched to the polar liquid. The second liquid can be, for example, a silicone oil, e.g., trimethylsiloxy-terminated poly(dimethylsiloxane), or any of a variety of organic liquids.

The cavity itself can have a variety of shapes. For example, in one embodiment, the cavity is substantially circular in shape, as shown in the exploded perspective view of FIG. 19. In other embodiments, the cavity is substantially rectangular, substantially triangular, or substantially hexagonal. Of course, the person of ordinary skill in the art can select other shapes for the cavity. In various embodiments of the electrowetting optical elements as described herein, the cavity is in the range of about 100 µm to about 10 mm in depth, and/or in the range of about 200 µm to about 20 mm in width.

Figure 20:
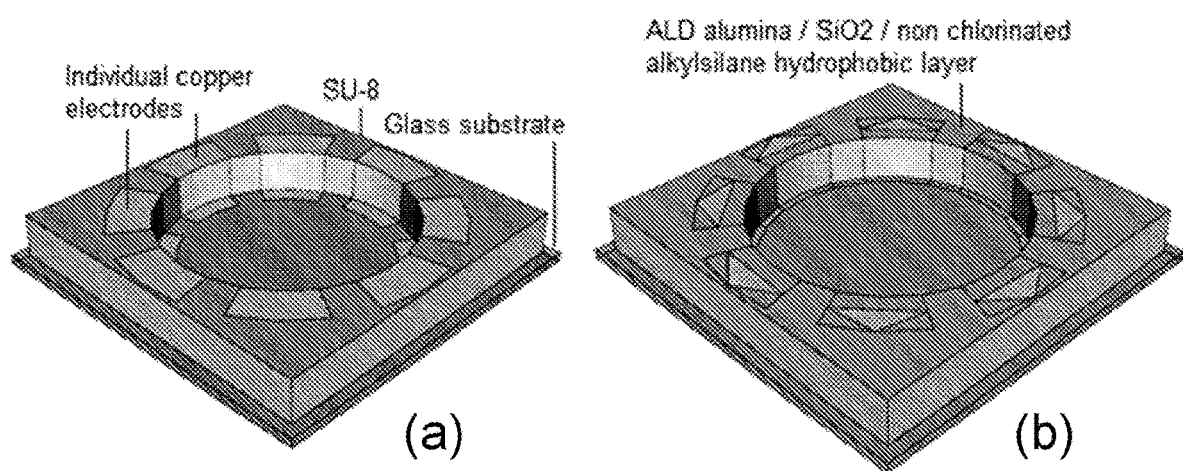
FIGS. 20(a) and 20(b) are a pair of views of the fabrication of an electrowetting optical element according to one embodiment of the disclosure. A plurality of first electrodes are provided, that, in combination with the application of different voltages, can tailor the shape of the surface of the first liquid, and thus the shape of the optical surface of the electrowetting optical element. Leads would trace out from under the top cover glass.
Figure 21:
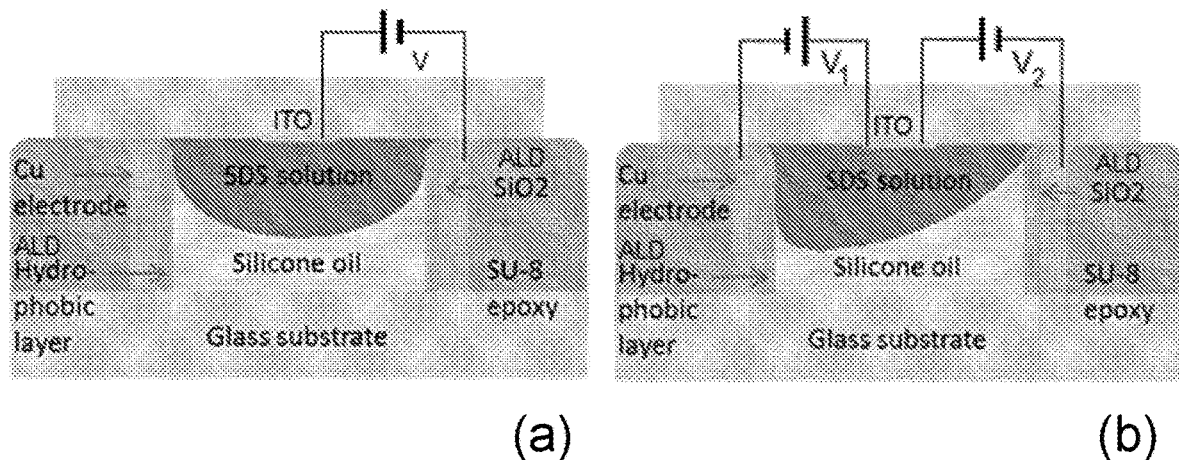
FIGS. 21 (a) and 21(b) are cross-sectional schematic views of an assembled electrowetting optical element under two different applied voltages. In each, from the SU-8 sidewall to the cavity holding the liquids, there are, in order, a layer of copper electrode, a layer of ALD-deposited $SiO_2$, and a layer of an ALD-deposited hydrophobic layer.

In certain embodiments, a plurality of independently-addressable first electrodes are provided along the sidewalls, as shown in FIG. 20. Independently-addressable electrodes can allow the electrowetting optical element to be addressed flexibly in order to provide a desired complex shape to the optical surface. This is shown in FIG. 21; as described in more detail below, putting different biases on different electrodes can allow the droplet of polar liquid to be pulled more toward one sidewall than another. There can be, for example, in the range of 2-30 (e.g., 4-20, or 6-16) independently-addressable electrodes (e.g., two, three, four, six, eight, ten, twelve, sixteen, twenty, twenty-four or thirty independently-addressable electrodes). The independently-addressable electrodes can be, for example, symmetrically distributed along the sidewalls around the cavity. The number of independently-addressable electrodes can be, for example, the same as the number of sidewalls (e.g., one on each sidewall, for example in the case of a polygonal shape). Each of the independently-addressable electrodes can be operatively coupled to a different voltage source, so that they can be independently addressed.

Figure 19:
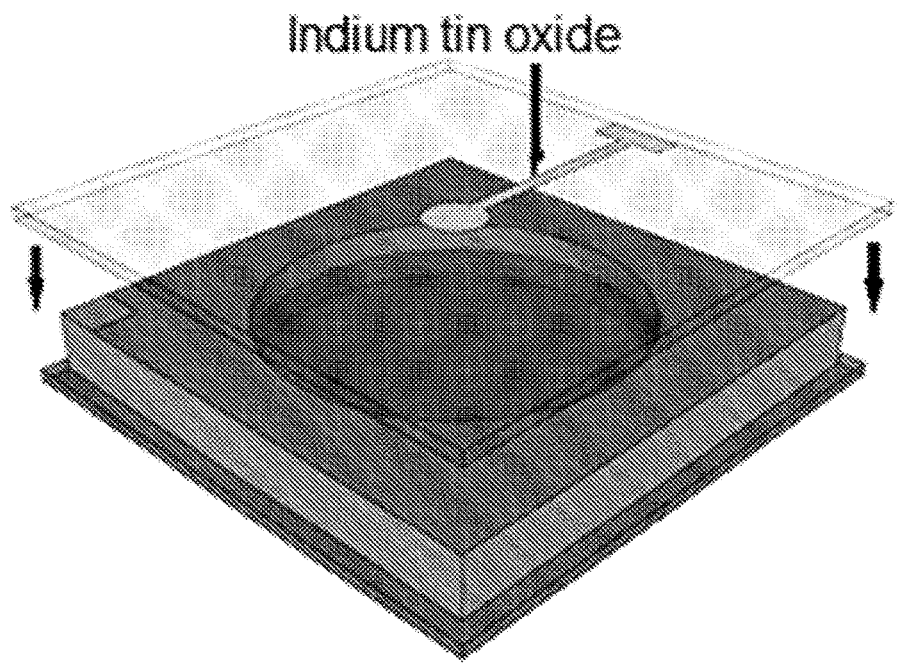
FIG. 19 is a schematic exploded perspective view of an electrowetting optical element according to one embodiment of the disclosure.

As noted above, the one or more second electrodes can, for example, be disposed on the substrate, or, if present, on a cover. In certain embodiments, a single second electrode is provided along the surface of the substrate (e.g., as shown in FIG. 17), or along the surface of the cover (e.g., as shown in FIG. 19). The single second electrode can be a common electrode against which the differently-addressable first electrodes are biased, i.e., it can be coupled to a plurality of voltage sources, each voltage source being coupled to a different differently-addressable first electrode along a sidewall. In other embodiments, a plurality of second electrodes are provided along the surface of the substrate or along the surface of the cover (if present). Each of the plurality of second electrodes can, for example, be coupled to a different voltage source.

Any second electrodes disposed on the substrate and/or on the cover are desirably substantially transparent (e.g., to the wavelength of the optical source). Accordingly, radiation can be transmitted through the lens element with relatively little optical loss. Such substantially transparent electrodes can be formed, for example, from indium tin oxide (ITO) or zinc oxide (ZnO), or a thin layer of gold. The person of ordinary skill in the art will appreciate that a variety of other transparent electrode materials can be used. If a substantially nontransparent second electrode is used, it desirably has a void formed therein to allow radiation to pass through.

Figure 22:
FIG. 22 is a schematic view of the manufacture of another electrowetting optical element of the disclosure.
Figure 22:
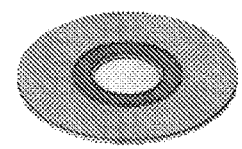
Figure 22:
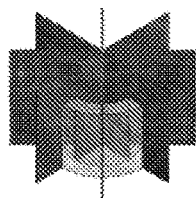
Figure 22:
Figure 22:
Figure 22:
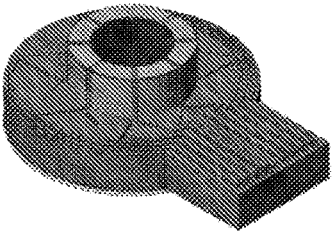

The manufacture of another embodiment of an electrowetting optical element is shown in schematic view in FIG. 22. Here, a clean glass tube has independently-addressable electrodes (a 300-nm of Indium Tin Oxide (ITO)) formed on an inner surface thereof using a 3D-printed shadowmask and a DC sputter deposition process. The inner surface is coated with Parylene HT ((~1 μm) via vapor-phase deposition, then dip-coated with Teflon AF1600 (from 1% solution in FC-40 (Fluorinert) and cured at 170° C. for 20 min. Separately, Ti/Au/Ti (10 nm/500 nm/10 nm) is evaporated and patterned in an annular shape on an optical window. This serves as the ground electrode for the electrowetting device. The annular pattern consists of a 3.75 mm clear aperture in the optical window for beam transmission. Next, a 50 μm layer of SU-8 3050 is spun and patterned on the ground electrode. The SU-8 serves as a bonding layer to the cylindrical glass tube. The glass tube is epoxy bonded to the patterned optical window bearing the annular Ti/Au/Ti electrode.

Figure 23:
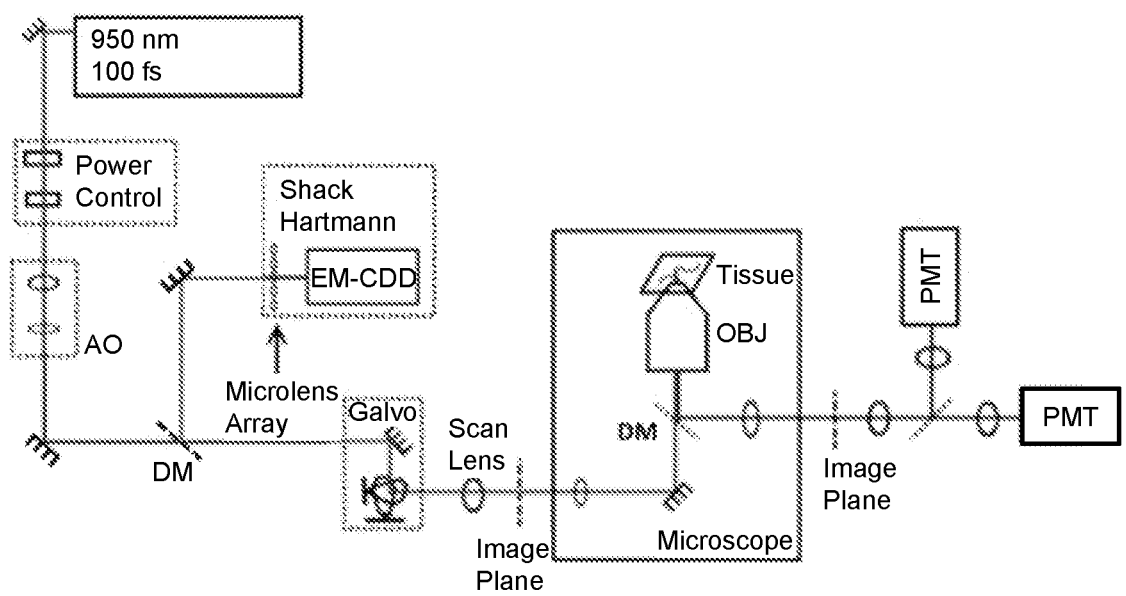
FIG. 23 is a schematic view of a two-photon optical microscope according to one aspect of the disclosure.

One example of a two-photon microscope according to another embodiment of the disclosure is shown in schematic view in FIG. 23. The aberration compensation system, including two multielectrode devices, can be integrated with a two-photon microscope. Two devices enable coverage of a larger parameter space for aberration correction. These elements will be placed in a conjugate plane with the back aperture of the objective lens. A Shack-Hartmann wavefront sensor (Photometrics, QuantEM:512SC with microlens array) can be placed before the galvo-scanners with a dichroic mirror that separates out the fluorescence in a descanned geometry. Positioned before the wavefront sensor, the multielectrode electrowetting devices can apply spatial aberration to compensate for the aberration from the tissue, in order to maintain a tight focus.

It is understood that the examples and embodiments described herein are for illustrative purposes only and that various modifications or changes in light thereof will be suggested to persons skilled in the art and are to be incorporated within the spirit and purview of this application and scope of the appended claims. All publications, patents, and patent applications cited herein are hereby incorporated herein by reference for all purposes

We claim:

1. A method of imaging an object, the method comprising:
   providing an optical imaging system comprising
   an optical assembly comprising one or more adaptive multielectrode electrowetting optical elements, each of the adaptive multielectrode electrowetting optical elements having at least at least three degrees of freedom; and
   a photodetector disposed so as to detect transmitted radiation from the object, the optical assembly being disposed in a beam path between the photodetector and the object, and
   receiving transmitted radiation from the object at the photodetector to provide a base image; and
   performing the following steps one or more times:
      adjusting the one or more adaptive multielectrode electrowetting optical elements, the adjustment including modifying an optical transfer function of the one or more adaptive multielectrode electrowetting optical elements, and
      receiving transmitted radiation from the object at the photodetector to provide an adjusted image;
   wherein the adjustment and receiving steps are performed until the adjusted image has substantially reduced aberrations compared to the base image.

2. The method according to claim 1, wherein each of the adaptive multielectrode electrowetting optical elements has at least six degrees of freedom.

3. The method according to claim 1, wherein each adaptive multielectrode electrowetting optical element comprises:
   a transparent substrate having a surface;
   one or more sidewalls extending from the surface of the substrate, the one or more sidewalls having surfaces defining a cavity;
   a polar liquid disposed within the cavity;
   a second liquid disposed within the cavity, the second liquid being immiscible with the polar liquid and having a different index of refraction than the first liquid, the second liquid being substantially electrically insulating, the polar liquid and the second liquid forming two distinct liquid phases within the cavity;
   a plurality of independently-addressable first electrodes disposed along the sidewalls of the cavity; and
   one or more second electrodes electrically isolated from the one or more first electrodes.

4. The method according to claim 1, wherein the optical imaging system further includes a source of incident radiation, and wherein the method includes illuminating the object with radiation from the source of incident radiation through the optical assembly.

5. The method according to claim 1, wherein the optical assembly comprises a first adaptive multielectrode electrowetting optical element and a second adaptive multielectrode electrowetting optical element, the first adaptive multielectrode electrowetting optical element having opposite overall focusing properties as compared to the second multielectrode electrowetting optical element.

6. The method according to claim 5, wherein the first adaptive multielectrode electrowetting optical element has an opposite gross optical transform as compared to the second adaptive multielectrode electrowetting optical element.

7. The method according to claim 1, wherein the optical transform of each of the adaptive multielectrode electrowetting optical elements is modified with respect to at least three Zernike polynomials.

8. The method according to claim 1, wherein aberration in the image is substantially decreased with respect to at least two Zernike polynomials other than polynomials $Z_1^1$, $Z_1^{-1}$ and $Z_2^0$.

9. The method according to claim 1, wherein an optical simulation is performed using the test image as a seed, and wherein the adjustment of the one or more adaptive multielectrode electrowetting optical elements is performed based on the optical simulation results.

10. The method according to claim 9, wherein the optical simulation includes
determining a test waveform from the test image,
conducting a plurality of iterations of simulating an adjustment of the one or more adaptive multielectrode electrowetting optical elements and computing an impact of the simulated adjustment of the one or more adaptive multielectrode electrowetting optical elements on the simulated waveform, and
identifying an adjustment of the one or more adaptive multielectrode electrowetting optical elements that substantially reduces the aberrations in the simulated waveform.

11. The method according to claim 10, wherein the conducting the plurality of iterations includes using a genetic algorithm to identify the correcting adjustment.

12. The method according to claim 11, wherein the genetic algorithm uses a population size of at least 30 and iterates through at least 10 generations.

13. The method according to claim 1, wherein the receiving and adjusting steps are performed using the feedback of the images received at the photodetector.

14. The method according to claim 13, wherein the receiving and adjusting steps include
conducting a plurality of iterations of adjustment of the one or more adaptive multielectrode electrowetting optical elements and determining an impact of the adjustment of the one or more adaptive multielectrode electrowetting optical elements on the received image, and
identifying an adjustment of the one or more adaptive multielectrode electrowetting optical elements that substantially reduces the aberrations in the image.

15. The method according to claim 14, wherein the conducting the plurality of iterations includes using a genetic algorithm to identify the correcting adjustment.

16. The method according to claim 15, wherein the genetic algorithm uses a population size of at least 30 and iterates through at least 10 generations.

17. A method of imaging an object, the method comprising:
providing an optical imaging system comprising
a source of incident radiation,
an optical assembly comprising one or more adaptive multielectrode electrowetting optical elements, each of the adaptive multielectrode electrowetting optical elements having at least at least three degrees of freedom, the optical assembly being disposed in a beam path between the source of radiation and the object, and
a photodetector disposed so as to detect transmitted radiation resulting from the interaction of the incident radiation with the object;
illuminating the object with incident radiation from the source of radiation through the one or more adaptive multielectrode electrowetting optical elements;
receiving transmitted radiation from the object at the photodetector to provide a base image; and
performing the following steps one or more times:
adjusting the one or more adaptive multielectrode electrowetting optical elements, the adjustment including modifying an optical transfer function of the one or more adaptive multielectrode electrowetting optical elements, and
receiving transmitted radiation from the object at the photodetector to provide an adjusted image;
wherein the adjustment and receiving steps are performed until the adjusted image has substantially reduced aberrations compared to the base image.

18. An optical imaging system for use with an object to be imaged, the optical imaging system comprising
a source of incident radiation,
an optical assembly comprising a first electrowetting adaptive multielectrode electrowetting optical element and a second adaptive electrowetting multielectrode electrowetting optical element, the first adaptive multielectrode electrowetting optical element having an opposite gross optical transform as compared to the second adaptive multielectrode electrowetting optical element, the optical assembly being disposed in a beam path between the source of radiation and the object, and
a photodetector disposed so as to detect transmitted radiation resulting from the interaction of the incident radiation with the object.

19. The optical imaging system according to claim 18, wherein the optical assembly is disposed in a beam path between the photodetector and the object.

20. A method of imaging an object, the method comprising:
providing an optical imaging system comprising
an optical assembly comprising two or more adaptive multielectrode electrowetting optical elements, each of the adaptive multielectrode electrowetting optical elements having at least at least three degrees of freedom; and
a photodetector disposed so as to detect transmitted radiation from the object, the optical assembly being disposed in a beam path between the photodetector and the object, and
receiving transmitted radiation from the object at the photodetector to provide a base image; and
performing the following steps two or more times:
adjusting the two or more adaptive multielectrode electrowetting optical elements, the adjustment including modifying an optical transfer function of the two or more adaptive multielectrode electrowetting optical elements, and
receiving transmitted radiation from the object at the photodetector to provide an adjusted image;
wherein the adjustment and receiving steps are performed until the adjusted image has substantially reduced aberrations compared to the base image.

* * * * *